United States Patent
Steinmetz et al.

(10) Patent No.: US 12,456,493 B2
(45) Date of Patent: Oct. 28, 2025

(54) SYSTEM FOR AUTOMATED MULTITRACK MIXING

(71) Applicant: Dolby International AB, Dublin (IE)

(72) Inventors: Christian James Steinmetz, Barcelona (ES); Joan Serra, Barcelona (ES)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 274 days.

(21) Appl. No.: 18/012,245

(22) PCT Filed: Jun. 16, 2021

(86) PCT No.: PCT/EP2021/066206
§ 371 (c)(1),
(2) Date: Dec. 22, 2022

(87) PCT Pub. No.: WO2021/259725
PCT Pub. Date: Dec. 30, 2021

(65) Prior Publication Data
US 2023/0352058 A1  Nov. 2, 2023

Related U.S. Application Data

(60) Provisional application No. 63/092,310, filed on Oct. 15, 2020, provisional application No. 63/072,762, filed on Aug. 31, 2020.

(30) Foreign Application Priority Data

Jun. 22, 2020 (ES) ................................ P202030604
Oct. 22, 2020 (EP) .................................... 20203276

(51) Int. Cl.
| | | |
|---|---|---|
| H04R 5/00 | (2006.01) |
| G06N 3/045 | (2023.01) |
| G11B 27/038 | (2006.01) |
| H04S 3/00 | (2006.01) |

(52) U.S. Cl.
CPC ........... *G11B 27/038* (2013.01); *G06N 3/045* (2023.01); *H04S 3/008* (2013.01); *H04S 2400/01* (2013.01); *H04S 2400/13* (2013.01)

(58) Field of Classification Search
CPC ........ G11B 27/038; G06N 3/045; H04S 3/008
See application file for complete search history.

(56) References Cited

U.S. PATENT DOCUMENTS

| | | |
|---|---|---|
| 8,367,923 B2 | 2/2013 | Humphrey |
| 9,304,988 B2 | 4/2016 | Terrell |

(Continued)

FOREIGN PATENT DOCUMENTS

| | | |
|---|---|---|
| JP | 2016521925 A | 7/2016 |
| WO | 2014183879 A1 | 11/2014 |
| WO | 2019121574 A1 | 6/2019 |

OTHER PUBLICATIONS

Hawley, S. et al "Signal Train: Profiling Audio Compressors with Deep Neural Networks" arxiv.org, May 28, 2019, Olin Library Cornell University Ithaca, NY.

Martinez, M. et al, Intelligent Audio Mixing Using Deep Learning, DMRN+11: Digital Music Research Network, Dec. 20, 2016, Queen Mary University of London, UK.

(Continued)

*Primary Examiner* — Simon King

(57) ABSTRACT

A deep-learning-based system for performing automated multitrack mixing based on a plurality of input audio tracks is described herein. The system comprises one or more instances of a deep-learning-based first network and one or more instances of a deep-learning-based second network. Particularly, the first network is configured to, based on the 5 input audio tracks, generate parameters for use in the automated multitrack mixing. The second network is configured to, based on the parameters, apply signal processing and at least one mixing gain to the input audio tracks, for generating an output mix of the audio tracks.

21 Claims, 10 Drawing Sheets

(56) References Cited

U.S. PATENT DOCUMENTS

| | | | |
|---|---|---|---|
| 9,665,823 | B2 | 5/2017 | Saon |
| 9,697,826 | B2 | 7/2017 | Sainath |
| 9,716,948 | B2 | 7/2017 | Tang |
| 9,952,826 | B2 | 4/2018 | Rowe |
| 10,564,923 | B2 | 2/2020 | Cardinaux |
| 11,552,611 | B2 * | 1/2023 | Veselinovic ............ H04M 9/08 |
| 2007/0083365 | A1 | 4/2007 | Shmunk |
| 2008/0199027 | A1 | 8/2008 | Kleczkowski |
| 2020/0321975 | A1 * | 10/2020 | Milot .................. H03M 7/3059 |
| 2021/0037287 | A1 * | 2/2021 | Ha ..................... H04N 21/4316 |

OTHER PUBLICATIONS

Moffat, D. et al, Approaches in Intelligent Music Production, MDPI Arts Journal, Sep. 25, 2019, arts8040125, MDPI, Basel, Switzerland.

Purwins, H. et al "Deep Learning for Audio Signal Processing" IEEE Journal of Selected Topics in Signal Processing, vol. 13, No. 2, May 2019, pp. 206-219.

Scott, J. et al "Automatic Multi-Track Mixing Using Linear Dynamical Systems" Jul. 6, 2011, retrieved from the Internet: SMC papers.

Steinmetz, C. "Towards end-to-end Multirack Mixing with Deep Learning" Master Thesis on Sound and Music Computing, Jul. 2020, pp. 1-29.

Xu, K. et al, Mixup-Based Acoustic Scene Classification Using Multi-Channel Convolutional Neural Network, Association for Computing Machinery (ACM), May 18, 2018; 1805.07319v1, Cornell University, Ithaca, New York.

* cited by examiner

SYSTEM FOR AUTOMATED MULTITRACK MIXING

CROSS-REFERENCE TO RELATED APPLICATIONS

This application is a National Phase entry of PCT Patent Application No. PCT/EP2021/066206, having international filing date of Jun. 16, 2021, which claims priority of the following priority applications: ES application P202030604 (reference: D20041ES), filed 22 Jun. 2020, U.S. provisional application 63/072,762, filed 31 Aug. 2020, U.S. provisional application 63/092,310, filed 15 Oct. 2020 and EP application 20203276.9 (reference: D20041EP), filed 22 Oct. 2020, which are hereby incorporated by reference.

TECHNICAL FIELD

The present disclosure generally relates to the field of audio mixing. In particular, the present disclosure relates to techniques for automated multitrack mixing in the waveform domain using machine-learning models or systems, and to frameworks for training such machine-learning models or systems.

BACKGROUND

Generally speaking, the journey from the original seed of a musical idea to the final recorded production involves a number of different steps that are often not evident from the perspective of the music listener. This process generally involves the collaboration of a number of different individuals who perform unique roles, each with their own skills and specialization, such as songwriters, musicians, producers, as well as the recording, mixing, and mastering engineers. One critical step in this process is the task of transforming the individual recorded elements into a final mixture, which is undertaken by the mixing engineer, and is often an integral part of the creative process in modern recordings.

This task of transforming a collection of audio signals into a cohesive mixture requires a deep understanding of disparate technical and creative processes. To effectively carry out this task, an audio engineer's specialized training involves developing the ability to recognize how to utilize an array of signal processing tools to achieve a set of desired technical and creative goals. Due to this reality, there are a number of driving factors in the development of intelligent music production (IMP) tools, tools that aim to offer assistance in parts of this complex process.

Recently, deep learning has demonstrated impressive results on many audio tasks that were previously thought to be extremely challenging. While these recent successes appear promising in our goal of advancing IMP systems, there are a number of challenges that impede our ability to design deep models for the multitrack mixing task. Foremost is the limited multitrack mix data available. In addition to the lack of parallel data, there is also the challenge in building a model that is able to adapt to the diversity present in real-world multitrack projects. The final and often overlooked challenge comes from the aforementioned nature of the mixing task. While conventions are evident among professionally produced mixes, it is clear that different, yet equally acceptable mixes, may be located in disparate areas of the so-called mix space or parameter space of the mixing console. Even when ignoring the task of attempting to model this complex one-to-many mapping, there still remains an inherent challenge when training a model in a supervised fashion to regress a ground truth mix.

Thus, there is a need for methods and systems of performing (automatic) multitrack audio mixing and possibly also for methods of training such systems for (automatic) multitrack mixing that can achieve improved performance (e.g., in terms of error rate, consistency, etc.) and/or efficiency, while at the same time allowing for good generalization to new audios (e.g., recordings) and/or listeners.

SUMMARY

In view of the above, the present disclosure generally provides deep-learning-based systems for performing automated multitrack mixing based on a plurality of input audio tracks, a method of operating a deep-learning-based system for performing automated multitrack mixing based on a plurality of input audio tracks and a method of training a deep-learning-based system for performing automated multitrack mixing based on a plurality of input audio tracks, as well as a corresponding (computer) program, computer-readable storage medium, and apparatus, having the features of the respective independent claims. The dependent claims relate to preferred embodiments.

According to an aspect of the disclosure, a deep-learning-based system for performing automated multitrack mixing based on a plurality of input audio tracks is provided. The input audio tracks may be prerecorded or provided in real time, for example. The input audio tracks may have also undergone suitable (pre-)processing, if necessary. The system may comprise one or more instances of a deep-learning-based first network. Particularly, the first network may be configured to, based on the input audio tracks, generate parameters for use in the automated multitrack mixing. The parameters may comprise, but are not limited to, control parameters, panning parameters, or any other appropriate parameters suitable for the process of audio mixing. The system may further comprise one or more instances of a deep-learning-based second network. The instances of the first network and/or the instances of the second network may be configured in a weight sharing manner. That is to say, in the case of multiple deep-learning-based first and/or second networks used, all of those first and/or second networks may be configured (applied) with the same weights (e.g. weight vectors). Particularly, the second network may be configured to, based on the parameters (that are generated by the first network), apply signal processing and at least one mixing gain to the input audio tracks, for generating an output mix of the audio tracks. In this sense, in some cases the first network may be referred to as a controller network (for providing parameters, such as control parameters); whilst the second network may be referred to as a transformation network (for performing audio transformation or processing). The signal processing may refer to applying suitable audio effects to the audio tracks. The signal processing (or audio signal effects) may include, but is not limited to, operations relating to gain, panning, equalization, dynamic range compression, reverberation, etc., as will be appreciated by the skilled person. In the context of multitrack audio mixing, a (mixing) gain may be seen as a simple and foundational transformation in some cases. While in some other case, a mixing gain and a panning gain may be applied. However, it should be understood any other suitable audio processing implementations may be performed, depending on various scenarios.

Configured as described above, broadly speaking, the proposed system architecture aims to learn the mixing practices of the audio engineer by directly observing the audio transformation of the original instrument recordings to the final mix. Further, to address the issue of scarcity of multitrack data and the large amount of data generally required for training deep learning models, the proposed system architecture presents a hybrid approach, which, generally speaking, comprises a first model (the second network) that learns the general signal processing algorithms in a mixing console, followed by a second model (the first network), which learns to control these channel-like submodules to generate a (final) mix. As such, systems for automated multitrack mixing can be trained in a flexible and efficient manner such that the systems can then be utilized/operated to perform multitrack mixing on the input audio tracks with reasonable mixing quality.

In some examples, the output mix may be a stereo mix. That is, the output mix may comprise one mix for the left channel and another mix for the right channel. Notably, in the case of stereo mixing, the second network may be configured to apply stereo mixing gains to the input audio tracks, namely one mixing gain for the left channel and another mixing gain for the right channel. Alternatively, the second network may also be configured to apply one mixing gain and one panning parameter (e.g., between 0 and 1) to generate the output stereo mix, which may simply mean that the parameter of the other channel would simply correspond to 1 minus such panning parameter.

In some examples, the first and second networks may be trained separately. In particular, the second network may be trained first (i.e., prior to the training of the first network), such that the first network may be trained based on the pre-trained second network. Configured as such, the hybrid configuration of separately training the first and second networks may significantly simplify the complexity in implementing and training the whole mixing system.

In some examples, a number of instances of the first network and/or a number of instances of the second network may be determined in accordance with (or based on) a number of the input audio tracks. For instance, in a possible implementation, the number of instances of the second network may equal the number of the input audio tracks. On the other hand, one or more instances of the first network may also be provided, in accordance with the number of instances of the second network and/or the number of the input audio tracks, depending on various implementations.

In some examples, the first network may comprise a first stage and a second stage. In particular, the generation of the parameters by the first network may comprise: mapping, by the first stage, each of the input audio tracks into a respective feature space representation; and generating, by the second stage, parameters for use by the second network, based on the feature space representations. The feature space representation may be a latent space representation, for example. In this sense, the first stage may sometimes also be referred to an encoding stage (or simply an encoder in some cases).

In some examples, the step of generating, by the second stage, the parameters for use by the second network may comprise generating a combined representation based on the feature space representations of the input audio tracks and generating parameters for use by the second network based on the combined representation (in addition or as an alternative to the feature space representations). The combined representation may be a concatenated representation of the feature space representations of the input audio tracks, which may be generated in any suitable means.

In some examples, the generation of the combined representation may involve (possibly among others) an averaging process on the feature space representations of the input audio tracks.

In some examples, the first network may be trained based on at least one loss function that indicates differences between predetermined mixes of audio tracks and respective predictions thereof.

In some examples, the first network may be trained by using any suitable means. Training may mean determining parameters for the deep learning model(s) (e.g., neural networks(s)) that is/are used for implementing the system. Further, training may mean iterative training. In a possible implementation, the training may comprise obtaining, as input, at least one first training set. In particular, the first training set may comprise a plurality of subsets of (e.g., prerecorded) audio tracks, and, for each subset, one or more predetermined mixes of the audio tracks in the subset. The predetermined mixes of the audio tracks in the subset may for example be provided (e.g., mixed) by an audio mixing engineer or by any suitable means, such that the predetermined mixes of the audio tracks may represent reasonable and acceptable audio mixes that could serve as a suitable basis (target) for the training. Further, the training may comprise inputting the first training set to the first network and iteratively training the first network to predict respective mixes of the audio tracks of the subsets in the training set. Particularly, the training may be based on at least one first loss function that indicates differences between the predetermined mixes of the audio tracks and respective predictions thereof.

In some examples, the predicted mixes of the audio tracks may be stereo mixes. Accordingly, the first loss function may be a stereo loss function and may be constructed in such a manner that it is invariant under re-assignment of left and right channels. In some possible cases, such invariance between the stereo channels may be achieved by considering the sum of the audio signals corresponding to the left and right channels, rather than considering those audio signals separately.

In some examples, the training of the first network to predict the mixes of the audio tracks may comprise, for each subset of audio tracks, generating, by the first network, a plurality of predicted parameters in accordance with the subset of audio tracks; feeding the predicted parameters to the second network; and generating, by the second network, the prediction of the mix of the subset of audio tracks, based on the predicted parameters and on the subset of audio tracks.

In some examples, the number of instances of the second network may equal the number of the input audio tracks. In this case, the second network may be configured to, based on at least part of the parameters, perform signal processing on a respective input audio track to generate a respective processed output. Particularly, the processed output may be a monaural audio signal or may comprise left and right channels (i.e., a stereo audio signal). The output mix may be generated based on the processed (e.g., mono or stereo) outputs.

In some examples, the system may further comprise a routing component (e.g., a router). Particularly, the routing component may be configured to generate a number of intermediate mixes (e.g., stereo mixes) based on the processed outputs, and the output mix may then be generated based on those intermediate mixes. In other words, the routing component may be seen as providing further suitable audio signal processing before generating the final audio mix. In some possible implementations, the routing component may be configured to generate appropriate bus-level mixes, such that the final audio mix may be generated based on those bus-level mixes.

In some examples, the first network may be configured to further generate suitable (e.g., control, routing, etc.) parameters for the routing component. For instance, the first network may be configured to generate (operational) parameters suitable for the routing component to perform the bus-level mixing.

In some examples, the one or more instances of the second network may be referred to as a first set of one or more instances of the second network, and the system may further comprise a second set of one or more (weight-sharing) instances of the second network. Particularly, a number of instances of the second set may be determined in accordance with the number of the intermediate mixes. For instance, in a possible implementation, each of the intermediate mix (e.g., the bus-level mix) generated by the routing component may be processed/handled by a stereo-linked pair of the second networks; and, for each of the intermediate mixes as input, a dual-stereo output may be generated by the stereo-linked pair of the second networks. Specifically, the stereo-linked connection may refer to the configuration of a pair of (two) second networks, each with its own input, where both of the second networks use the same parameter(s) to apply the same signal processing to each input, each producing a stereo output. The dual-stereo may refer to the configuration of a system in which the input is a stereo signal, and the output produces separate signals for left and right outputs (channels), which may later be summed together respectively, to generate an overall left and right stereo signal.

In some examples, the first network may be configured to further generate (e.g., bus control) parameters for the second set of instances of the second network.

In some examples, the system may be configured to further generate a left mastering mix and a right mastering mix based on the intermediate mixes. For instance, in a possible implementation, the second set of instances of the second network may be configured to take the intermediate mixes as input and to generate a left mastering mix and a right mastering mix based thereon. As an example, the left mastering mix and the right mastering mix may be generated by summing (e.g., averaging) all left channel signals processed by the second set of the second networks and all right channel signals processed by the second set of the second networks, respectively. The system may further comprise a pair of (weight-sharing) instances of the second network, and the pair of instances of second network may be configured to generate the output mix based on the left and right mastering mixes.

In some examples, the first network may be configured to further generate (e.g., master control) parameters for the pair of instances of the second network.

In some examples, the second network may be trained by using any suitable means. Training may mean determining parameters for the deep learning model(s) (e.g., neural networks(s)) that is/are used for implementing the system. Further, training may mean iterative training.

In a possible implementation, the training for the second network may comprise obtaining, as input, at least one second training set. Particularly, the second training set may comprise a plurality of audio signals, and, for each audio signal, at least one transformation parameter for signal processing of the audio signal and a respective predetermined processed audio signal. The predetermined processed audio signal may for example be provided (e.g., processed) by an audio engineer or by any other suitable means, such that the predetermined processed audio signal may represent a reasonable and acceptable processed audio signal that could serve as a suitable basis (target) for the training. The training may further comprise inputting the second training set to the second network; and iteratively training the second network to predict respective processed audio signals based on the audio signals and the transformation parameters. Particularly, the training may be based on at least one second loss function that indicates differences between the predetermined processed audio signals and the respective predictions thereof.

In some examples, the parameters generated by the first network may be human and/or machine interpretable parameters. Human interpretable parameters may generally mean that the parameters can be interpreted (understood) by human, e.g., an audio engineer, such that the audio engineer can (directly) use or apply those parameters for further audio signal processing or analysis, if deemed necessary. Similarly, machine interpretable parameters may generally mean that the parameter can be interpreted by machine, e.g., a computer or a program stored thereon, such that those parameters can be (directly) used by the program (e.g., a mixing console) for further audio processing or analysis, if deemed necessary.

In some examples, the parameters generated by the first network may comprise control parameters and/or panning parameters, as mentioned above. Of course, the parameters generated by the first network may comprise any other suitable parameters, according to various implementations (e.g., those parameters existing in a real-world mixing console).

In some examples, the first and/or second network may comprise at least one neural network. Particularly, the neural network may comprise at least one of a linear layer, a multilayer perceptron, MLP, etc., as will be understood by the skilled person.

In some examples, the neural network may be a convolutional neural network (CNN), such as a temporal convolutional network (TCN), or a Wave-U-Net, a recurrent neural network (RNN), or may include attention layers or transformers. Of course, any other suitable neural network may be applied, as will be appreciated by the skilled person.

According to another aspect of the disclosure, a deep-learning-based system for performing automated multitrack mixing based on a plurality of input audio tracks is provided. The system may comprise a transformation network. In some cases, the transformation network may correspond to the second network as illustrated above. In particular, the transformation network may be configured to apply signal processing and at least one mixing gain to the input audio tracks for generating an output mix of the audio tracks, based on one or more parameters. The parameters may be generated by another network element (e.g., a controller network or the first network as illustrated above).

In some examples, the parameters may be human interpretable parameters. For instance, the parameters may be interpretable (or usable) by an audio engineer, such that the audio engineer may (directly) use or apply those parameters for further audio signal processing or analysis, if deemed necessary. In some cases, the human (or machine) interpretable parameters may simply refer to the ones that could be found in a regular/real-world mixing console.

In some examples, the system may comprise a plurality of instances of the first network in a weight-sharing configuration; and/or a plurality of instances of the second network in a weight-sharing configuration. As mentioned earlier, the weight-sharing configuration may generally mean that all of those first and/or second networks may be configured (applied) with the same weights (e.g., weight vectors).

According to another aspect of the disclosure, a method of operating a deep-learning-based system for performing automated multitrack mixing based on a plurality of input audio tracks is provided. The system may comprise one or more instances of a deep-learning-based first network and one or more instances of a deep-learning-based second network. The method may comprise generating, by the first network, parameters for use in the automated multitrack mixing, based on the input audio tracks. In addition, the method may further comprise applying, by the second network, signal processing and at least one mixing gain to the input audio tracks based on the parameters, for generating an output mix of the audio tracks.

According to another aspect of the disclosure, a method of training a deep-learning-based system for performing automated multitrack mixing based on a plurality of input audio tracks is provided. Training may mean determining parameters for the deep learning model(s) (e.g., neural networks(s)) that is/are used for implementing the system. Further, training may mean iterative training. The system may comprise one or more instances of a deep-learning-based first network and one or more instances of a deep-learning-based second network. Particularly, the method may comprise a (first) training phase for training the second network, and the (first) training phase for training the second network may comprise: obtaining, as input, at least one first training set, wherein the first training set comprises a plurality of audio signals, and, for each audio signal, at least one transformation parameter for signal processing of the audio signal and a respective predetermined processed audio signal; inputting the first training set to the second network; and iteratively training the second network to predict respective processed audio signals based on the audio signals and the transformation parameters in the first training set. Particularly, the training of the second network may be based on at least one first loss function that indicates differences between the predetermined processed audio signals and the respective predictions thereof.

In some examples, the method may further comprise a (second) training phase for training the first network, and the (second) training phase for training the first network may comprise: obtaining, as input, at least one second training set, wherein the second training set comprises a plurality of subsets of audio tracks, and, for each subset, a respective predetermined mix of the audio tracks in the subset; inputting the second training set to the first network; and iteratively training the first network to predict respective mixes of the audio tracks of the subsets in the second training set. Particularly, the training of the first network may be based on at least one second loss function that indicates differences between the predetermined mixes of the audio tracks and the respective predictions thereof.

In some examples, the (second) training phase for training the first network may start after the (first) training phase for training the second network has been finished. In other words, the training of the first network may be performed with the help of the pre-trained second network.

According to a further aspect of the disclosure a computer program is provided. The computer program may include instructions that, when executed by a processor, cause the processor to carry out all steps of the example methods described throughout the disclosure.

According to a further aspect, a computer-readable storage medium is provided. The computer-readable storage medium may store the aforementioned computer program.

According to yet a further aspect, an apparatus including a processor and a memory coupled to the processor is provided. The processor may be adapted to cause the apparatus to carry out all steps of the example methods described throughout the disclosure.

It will be appreciated that system features and method steps may be interchanged in many ways. In particular, the details of the disclosed method(s) can be realized by the corresponding system, and vice versa, as the skilled person will appreciate. Moreover, any of the above statements made with respect to the method(s) are understood to likewise apply to the corresponding system, and vice versa.

BRIEF DESCRIPTION OF THE DRAWINGS

Example embodiments of the disclosure are explained below with reference to the accompanying drawings, wherein.

DETAILED DESCRIPTION

Figure 2:
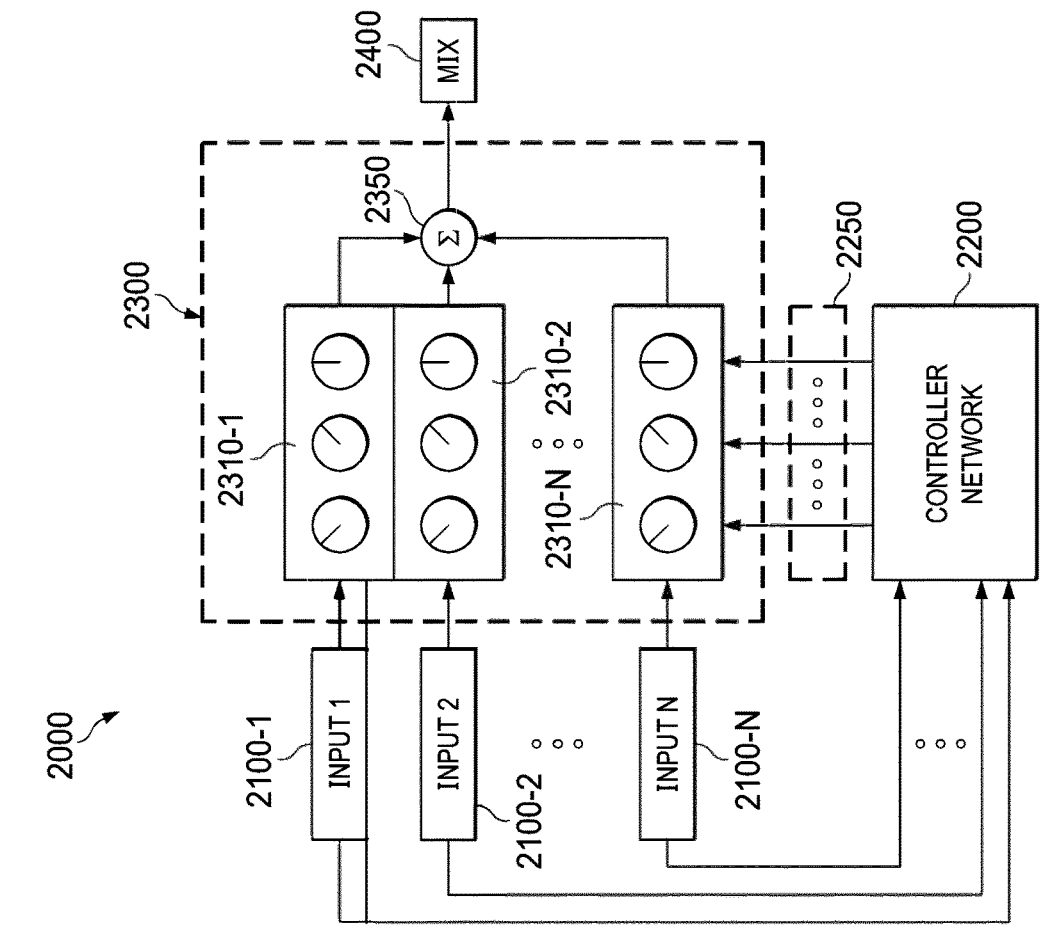
FIG. 2 is a schematic illustration of a block diagram of a system for performing multitrack mixing according to an embodiment of the present disclosure.

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As mentioned earlier, the success of deep learning in related audio tasks seems to motivate the interest in the application of these models for automatic multitrack mixing systems. Due to the absence of parametric mixing console data (i.e., collections of the settings used by audio engineers) and the inability to propagate gradients through the mixing console in the training process, end-to-end models that operate directly at the waveform level may seem to provide the most feasible option. In the present disclosure it is aimed to learn the mixing practices of the audio engineer by directly observing the audio transformation of the original instrument recordings to the final stereo mix.

Unfortunately, due to the scarcity of multitrack data and the large amount of data generally required for training deep learning models, it seems unlikely that this approach would be feasible. To address this, this disclosure generally presents a hybrid approach where a model that learns the general signal processing algorithms in a mixing console is constructed first, followed by a second (smaller) model, which learns to control these channel-like submodules to generate a mix.

Broadly speaking, the first model (e.g., the claimed second network) may operate directly on audio signals and learn to emulate the signal processing algorithms present in a traditional mixing console. Since the algorithms from the traditional mixing console (e.g., equalizer, compressor, reverberation) may be accessible, this model can be trained with an effectively unlimited supply of generated examples. This trained model may then be used to construct a complete mixing console by composing multiple instances. A second smaller model (sometimes also referred to as a controller, e.g., the claimed first network) may be trained to generate a set of control signals (or any other suitable signals/parameters) for these instances to create a quality mix of the inputs. Since not all elements in the traditional mixing console are differentiable, learning in this manner has not been possible. The presently described formulation enables directly learning the control signals to produce mixes in the waveform domain.

Figure 1:
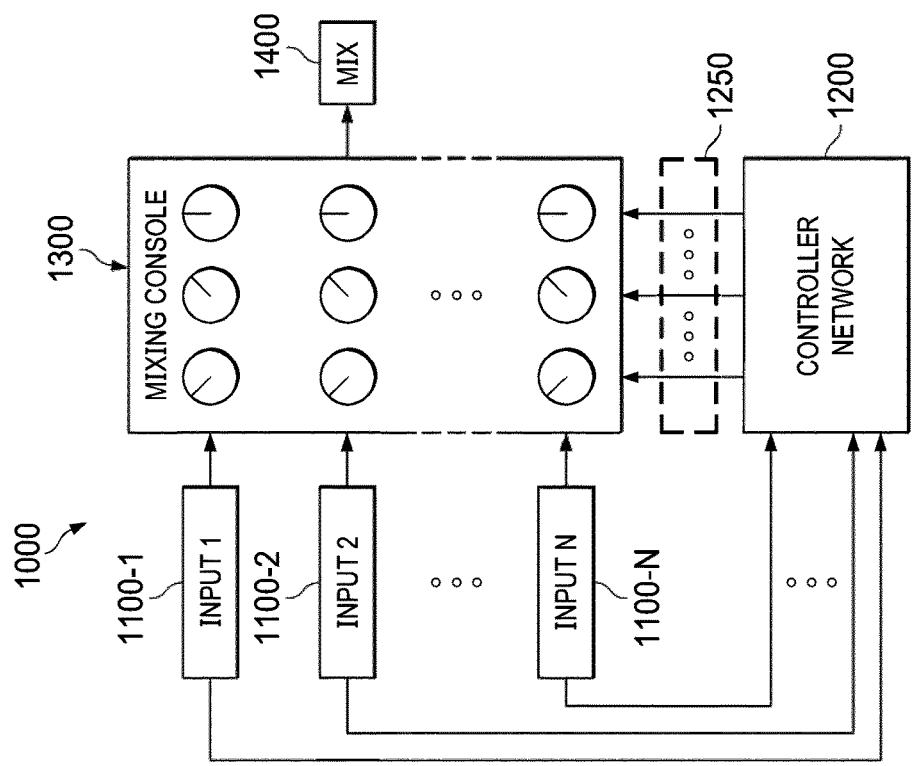
FIG. 1 is a schematic illustration of a block diagram of a system for performing multitrack mixing according to an embodiment of the present disclosure.

Referring to FIG. 1, a schematic illustration of a (simplified) block diagram of a system 1000 for performing multitrack mixing according to an embodiment of the present disclosure is shown. In particular, The system 1000 takes a number N of audio tracks (signals) 1100-1, 1100-2, . . . , 1100-N as input, and aims to provide a (meaningful) audio mix 1400 thereof. The input audio tracks 1100-1 to 1100-N are in parallel also fed into a controller network 1200 (or sometimes simply referred to as a controller) for analysis (e.g., pre-processing). Generally speaking, in a possible implementation, the controller network 1200 may take in these input audio tracks 1100-1 to 1100-N, extract (relevant) information from those input audio tracks 1100-1 to 1100-N, and produce as output a set of parameters 1250 for each audio track (channel). The parameters 1250 may comprise control parameters, panning parameters, or any other types of parameters that are suitable for the audio mixing. The mixing process may then be carried out by a so-called mixing console 1300. The mixing console 1300 may be operated e.g., by an audio engineer, based on the input audio tracks 1100-1 to 1100-N and on the parameters 1250, in order to generate the final output audio mix 1400.

Generally speaking, the task of transforming a collection of audio signals into a cohesive mixture requires a deep understanding of disparate technical and creative processes. In order to effectively carry out this task, traditionally an audio engineer's specialized training may typically involve developing the ability to recognize how to utilize an array of signal processing tools to achieve a set of desired technical and creative goals. Thus, there is interest in systems that are able to carry out this process in an automatic way, similar to audio engineers, in order to provide a tool to novice users, as well as reduce the time required for skilled engineers.

Recently, deep learning has demonstrated impressive results on many audio tasks that were previously thought to be extremely challenging (e.g. speech synthesis, instrument synthesis, and source separation). For this reason, there is generally interest in the application of these models within the context of methods for automated multitrack mixing. This system may take a number of input audio recordings of different sources, process them individually, and then combine them to create a final mixture, as the audio engineer would.

Unfortunately, there seem to be a number of challenges in applying deep learning approaches to this task, and thus far these challenges have completely impeded such applications. One of the most significant challenges seems to be the limited size of the available training data. And due to this reality, it is unlikely that a canonical deep neural network, where the input is a collection of multitrack recordings and the output is a mix of those tracks, will be able to be trained in an end-to-end fashion. Training end to-end models operating in the waveform domain may require upwards of one million samples to perform as effectively on classification tasks, and while spectrogram based approaches have been shown to perform more competitively with less data, such an approach is more problematic for tasks that involve audio as their output due to challenges in modeling the phase.

In view of some or all of the above challenges, it is generally proposed that the mixing console 1300 itself may be replaced with a set of neural networks, allowing one to build a fully differentiable mixing console with deep learning building blocks. To do so, it is noted that the mixing console 1300 itself is composed of a set of repeated channels, all of which enable the same set of transformations using e.g., a composition of processors. Therefore, in order to emulate the mixing console 1300, generally speaking, all that has to be done is to emulate a single channel within the console, and then apply weight sharing across all channels. Broadly speaking, this may be achieved by designing an appropriate network and training it to emulate the signal processing chain of a single channel in the mixing console, with the ability to extend this network across multiple input recordings. Ideally, when this network is given an audio signal and parameter(s) for processors in the channel, it will produce an audio signal that is indistinguishable from the output of the true mixing console channel (e.g., operated by an audio engineer).

The above concept is schematically shown in FIG. 2. Notably, identical or like reference numbers in FIG. 2 may indicate identical or like elements in the system 1000 as shown in FIG. 1, such that repeated description thereof may be omitted for reasons of conciseness. As shown in FIG. 2, the mixing console 1300 of FIG. 1 is now being replaced by a number of (neural) networks 2310-1, 2310-2, . . . , 2310-N, each of which may be trained to emulate the signal processing chain of a single channel in the mixing console. In this sense, this neural network may sometimes also be referred to as a transformation network. In the example of FIG. 2, the number of neural networks 2310-1 to 2310-N equals the number of tracks (channels) of the inputs 2100-1 to 2100-N, but it should be understood that these numbers do not necessarily have to be always the same. In the example of FIG. 2, each network may then be applied across each input channel, and the controller network 2200 now produces one set of parameters for each input channel to produce a mix, which is the sum (e.g., using a summing component 2350) of the outputs of each network. Notably, this approach (i.e., all N instances of the networks 2310-1 to 2310-N being applied with the same set of parameters) may also be referred to as weight sharing in some cases.

Configured as such, the proposed design may enable or facilitate the training of the controller network, as the complete system would be fully differentiable. Additionally, the present disclosure also provides the benefit of easily scaling to many different effects (or signal processing) that are to be applied during the course of the mixing, and potentially growing the size of the signal chain without the need for creating unique differentiable implementations of each new digital audio effect. Thereby, complexity in the designing and/or training can be significantly reduced, so that efficiency of the whole system can be significantly improved.

Summarizing, the transformation networks 2310-1 to 2310-N may replace the traditional channels in a typical mixing console and attempt to operate in an identical (weight-sharing) manner when provided with an input signal and a set of parameters. By composing multiple instances of the same (pre-trained) transformation network, a complete differentiable "mixing console" 2300 can be constructed that ultimately enables training of the controller network 2200, while at the same time facilitating learning from limited data. Notably, in some cases the controller network 2200 of the system 2000 may be simply referred to as a first network; while the transformation network may be simply referred to as a second network.

As indicated above, training of the controller network (the first network) may be performed separately from the training of the transformation network (the second network). In some possible implementations, the transformation network may be trained prior to the training of the controller network; or in other words, the training of the controller network may rely on the pre-trained transformation network.

Figure 3:
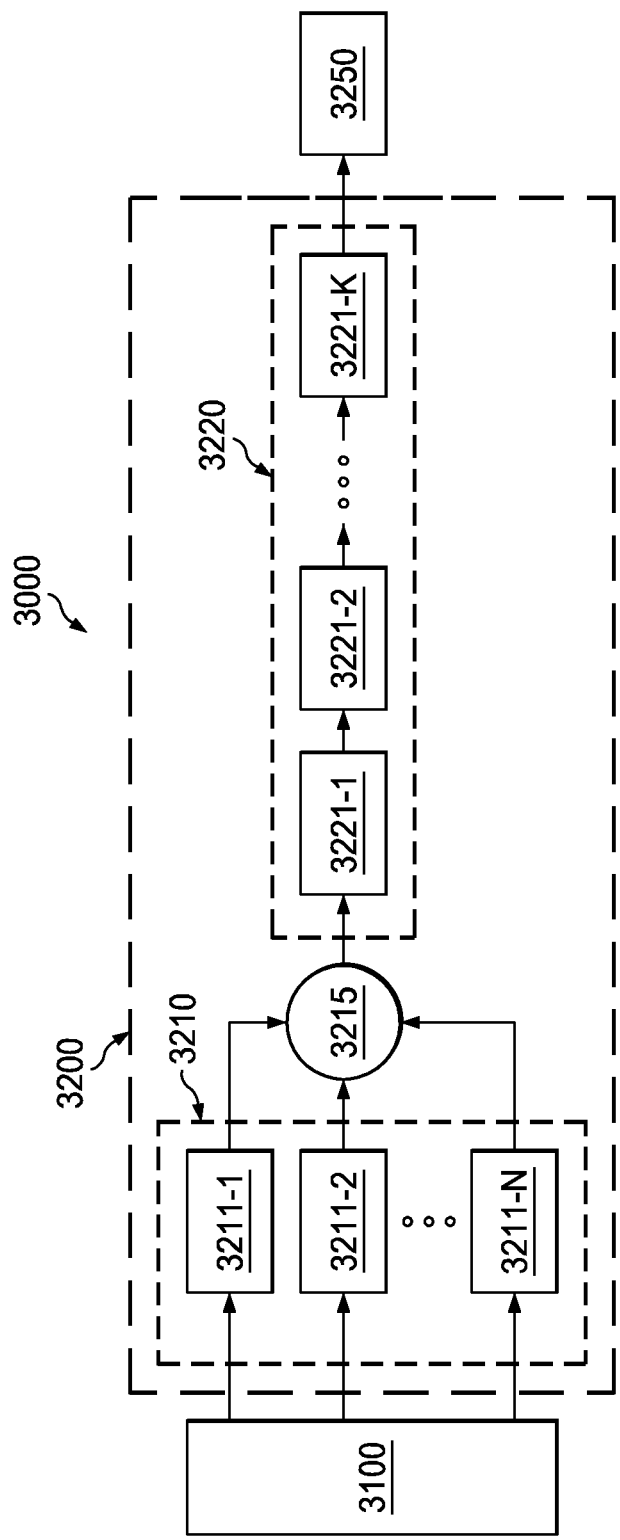
FIG. 3 is a schematic illustration of a block diagram of a configuration of a controller network according to an embodiment of the present disclosure.

FIG. 3 is a schematic illustration of a block diagram of a configuration 3000 of a controller network 3200 according to an embodiment of the present disclosure. The controller network 3200 may be similar to that has been shown in FIG. 1 or 2. Thus, broadly speaking, the controller network 3200 may be seen as comprising at least one (deep) neural network trained to produce a set of parameters 3250 (e.g., for a mixing console or one or more transformation networks) to produce a desirable mixture given audio waveforms of the inputs 3100.

Particularly, in the example as shown in FIG. 3, the controller network 3200 may comprise two stages (or two sub-networks), namely a first stage 3210 and a second stage 3220. In some cases, the first stage 3210 may be referred to as an encoding stage (or simply encoder); while the second stage 3220 may be referred to as a post-processing stage (or simply post-processor).

Generally speaking, the encoding stage 3210 may assume the role of extracting relevant information from the input channels. For instance, such extraction may involve transferring (or mapping) the input audio waveforms into feature space representations (e.g., latent space representations). The kind of information that may be relevant to the mixing task may be characteristics like the source of the inputs (e.g. guitar, drum, voice, etc.), as well as more detailed information such as the energy envelop over time, or the allocation of energy across the frequency spectrum, which might be needed in understanding masking interactions among sources. Typically, these are the same or similar kinds of considerations that audio engineers would make when attempting to create a (manual) audio mix. The encoding stage 3210 may then produce a representation for each input signal (channel). For this purpose, the encoding stage 3210 may comprise a number (e.g., which may be equal to the number of channels/tracks in the input 3100) of (sub-) encoders 3211-1, 3211-2, . . . , 3211-N. The output of the encoding stage 3210 will subsequently be passed on to the post-processing stage 3220.

Broadly speaking, the role of the post-processing stage 3220 may be to aggregate information from the encoder, in order to make a decision about how to parameterize the transformation network operating on the associated input recording. Notably, in some examples, such decision may not be made in isolation from the other input channels, as each mixing decision might generally be highly dependent on some or all other inputs. Taking this into consideration, the post-processing stage 3220 may be provided with a learned representation not only of the respective input audio track, but also a combined (or concatenated) representation that somehow represents or summarizes some or all of the inputs. In a possible implementation, this may be achieved by a simple average (as exemplified by 3215) across all input representations output by the encoders 3211-1 to 3211-N. Of course, any other suitable means may be adopted in order to generate the appropriate combined representation, depending on various implementations and/or requirements. In some cases, such combined representation may also be denoted as a context representation. Based on the combined representation, the post-processing stage 3220 may then be configured (trained) to output a set of parameters that can be used for audio mixing (e.g., by the transformation network, or any other suitable network component). Similar as the encoding stage 3210, the post-processing stage 3220 may itself also comprise a suitable number of (sub-)post-processors 3221-1, 3221-2, . . . , 3221-K, depending on various implementations. Notably, in some possible implementations, weight sharing concept as mentioned above may also be applied (extended) to the controller network 3220. As an example, one instance (pair) of the sub-encoder (e.g., 3211-1) and post-processor (e.g., 3221-1) could be applied individually to each of the input channels, producing a set of parameters for each channel to be passed to the transformation networks (which also have shared weights as already illustrated above). As such, it may be considered that weight-sharing has been applied in a (complete) system-level. An example of such system-level weight-sharing is also shown in FIG. 5, which will be discussed below in more detail.

Figure 4A:
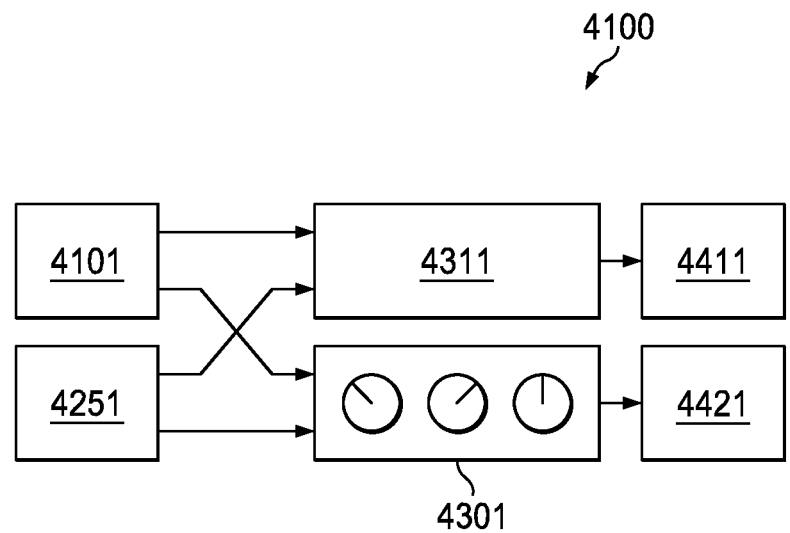
FIG. 4A is a schematic illustration of a block diagram of a training model of a transformation network according to an embodiment of the present disclosure.

FIG. 4A is a schematic illustration of a block diagram of a training model 4100 for a transformation network 4311 according to an embodiment of the present disclosure. The transformation network 4311 may be the same as or similar to the transformation network 2310-1 as shown in FIG. 2.

Generally speaking, the goal of the transformation network is to build a model that can implement the common signal processing tools utilized by the audio engineer (e.g., equalizer, compressor, reverberation, etc.) in a differentiable way. This network is required since traditional signal processing algorithms implement functions with potentially badly behaved or intractable gradients, making their use challenging in the process of training a model to control them to generate a mix. In the broad sense, the transformation network may take as input an audio signal, as well as a set of parameters that define the controls of all of the processors in the signal chain, possibly also along with their respective orders. The transformation network may then be trained to produce the same output as the true set of signal processors. During training, input/output pairs may be generated e.g., by randomizing the state of the processor parameters in the true signal chain, and then passing various signals through this signal chain to generate targets waveforms. These pairs are then used for learning the transformation network. In this sense, such training process may be considered as being completed in a self-supervised manner, with a nearly infinite set of training data. The training data may then be collectively compiled into at least one training set, which will be used for (iteratively) training the transformation network, as will be appreciated by the skilled person.

Now referring to FIG. 4A, the transformation network 4311 takes as input two sets of values, namely the input audio waveform 4101 itself, and the corresponding parameters 4251 for controlling the signal processing of the audio waveform 4101. In some cases, the signal processing may relate to audio effects, such as (but is not limited to) gain, panning, equalization, dynamic range compression, reverberation, etc., as will be appreciated by the skilled person. The input audio 4101 and the parameters 4251 will be input to both the to-be-trained network 4311 and a traditional mixing console 4301, such that the respective outputs, i.e., the "true" processed audio signal 4421 and the predicated processed audio signal 4411 can be compared, for facilitating the further training process.

Figure 4B:
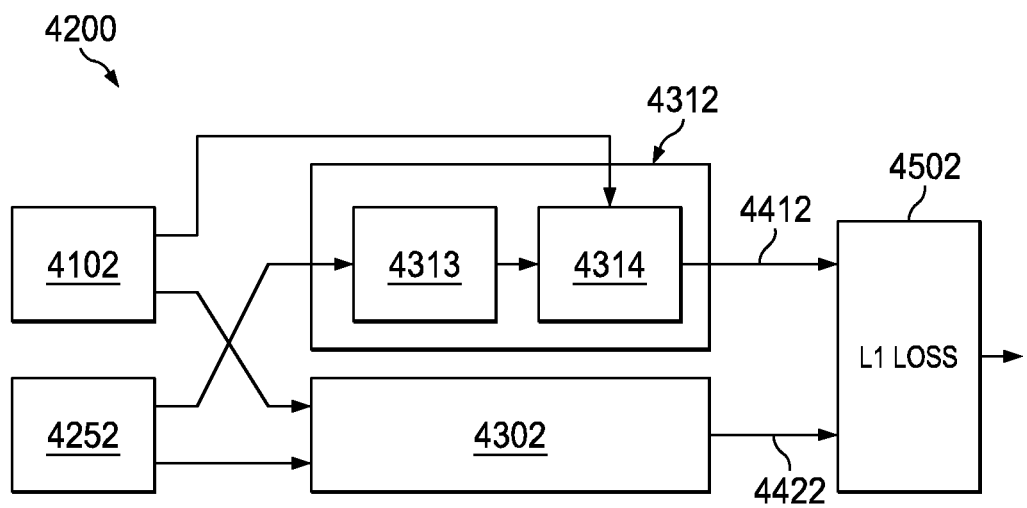
FIG. 4B is a schematic illustration of a block diagram of a training model of a transformation network according to another embodiment of the present disclosure.

FIG. 4B schematically illustrates a block diagram of a (slightly more detailed) training model 4200 of a transformation network 4312 according to another embodiment of the present disclosure. Particularly, identical or like reference numbers in the model 4200 of FIG. 4B indicate identical or like elements in the model 4100 as shown in FIG. 4A, such that repeated description thereof may be omitted for reasons of conciseness. Similar as above, broadly speaking, the transformation network 4312 may be generally considered as comprising at least one deep neural network trained to mimic the processing of a traditional channel in a mixing console, given a set of parameters that define the channel's configuration.

In the example model 4200 of FIG. 4B, the transformation network is shown as comprising two sub-networks 4313 and 4314, which may both be neural networks themselves. In a possible implementation, the first sub-network 4313 may be a parameter deep neural network (or P-DNN for short) that takes the input audio waveform 4102 and the parameter(s) 4252 as input; while the second sub-network 4314 may be a transform deep neural network (or T-DNN for short) that takes the input audio 4102 and the outcome of the P-DNN 4313 as input, and output a predication 4412 of a processed audio signal. In some possible implementations, the training may be performed with the help of a loss function 4502 that may indicate differences between the predetermined ("true") processed audio signal 4422 (processed by the mixing console channel 4302 based on the audio input 4102 and the corresponding parameters 4252) and the respective prediction 4412 thereof.

With this trained transformation network according to either FIG. 4A or 4B, a differential mixing console proxy may then be constructed that could utilize multiple instances of these pre-trained transformation networks. As discussed above, weights may be shared among all instances, which enforces that processing on each channel of the console functions in the same way. Subsequently, the controller network may be introduced, which generally aims to generate the parameter conditioning for each of the individual transformation networks, given information about the input audio channels.

Broadly speaking, for the training of the controller network (e.g., the control network 3200 as shown in FIG. 3), paired multitrack stems may be fed as input to the transformation network instances and a mixture may be produced by the controller network. The mixture may then be compared with the ground truth mixture in order to train the controller network, which has been made feasible since all elements are fully differentiable. In some possible implementations, the training may be performed based on at least one loss function that indicates differences between the predetermined mixes ("ground truth mixes") of the audio tracks and respective predictions thereof. Optionally, during the training process, the weights of the controller network may be fine-tuned. Ultimately, the proposed system may generally enable the ability to learn directly from a set of limited multitrack stems and their respective mixes at the waveform level.

Figure 5A:
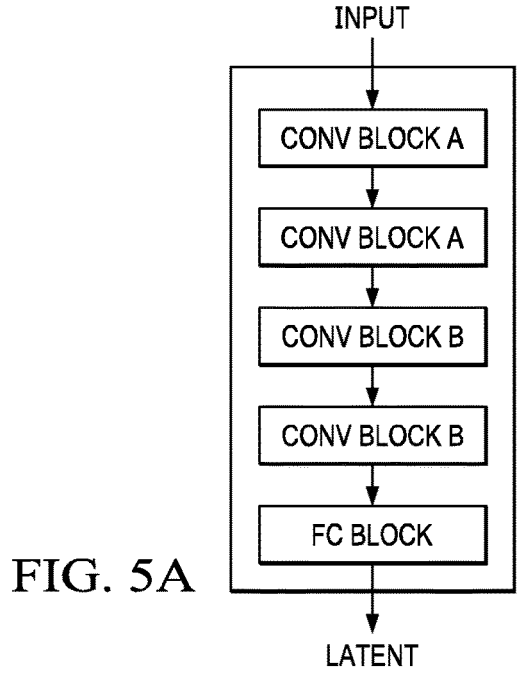
FIGS. 5A-5D are schematic illustrations of block diagrams of a system for performing multitrack mixing according to an embodiment of the present disclosure.
Figure 5B:
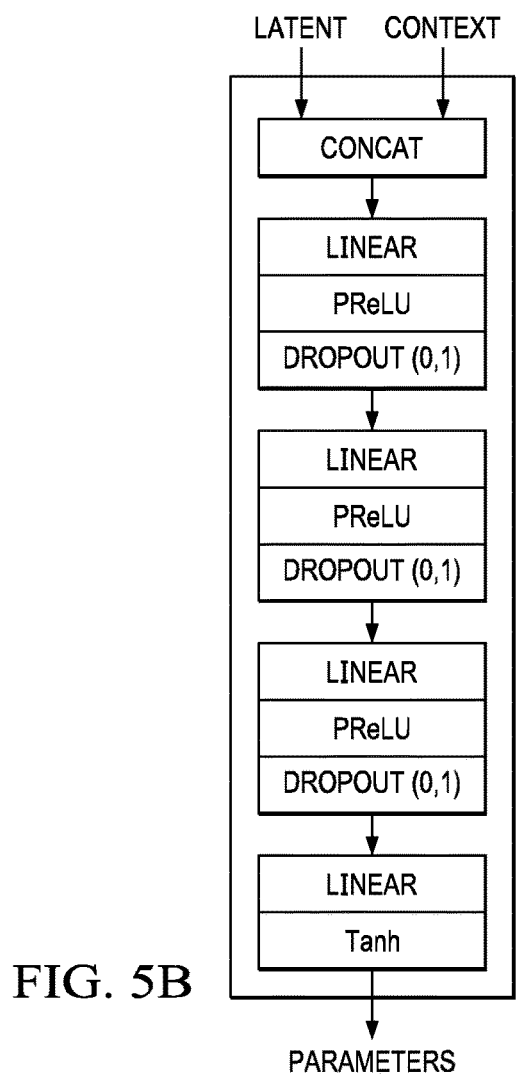
Figure 5C:
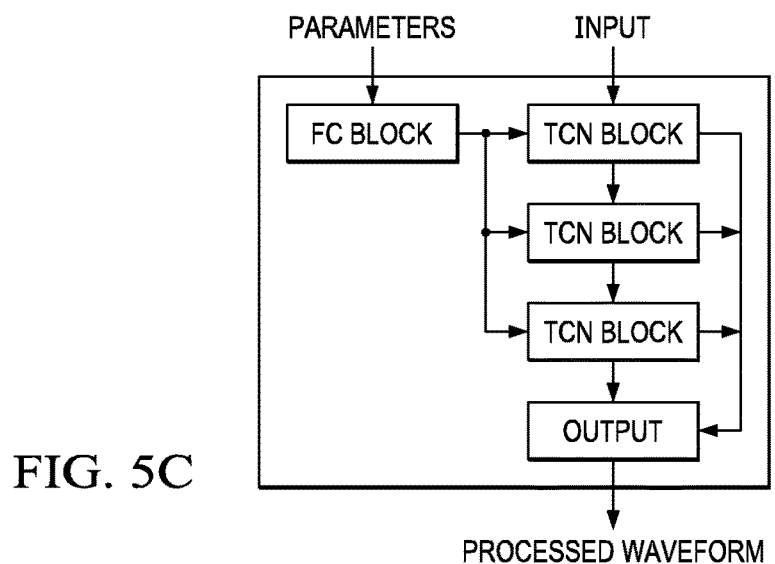
Figure 5D:
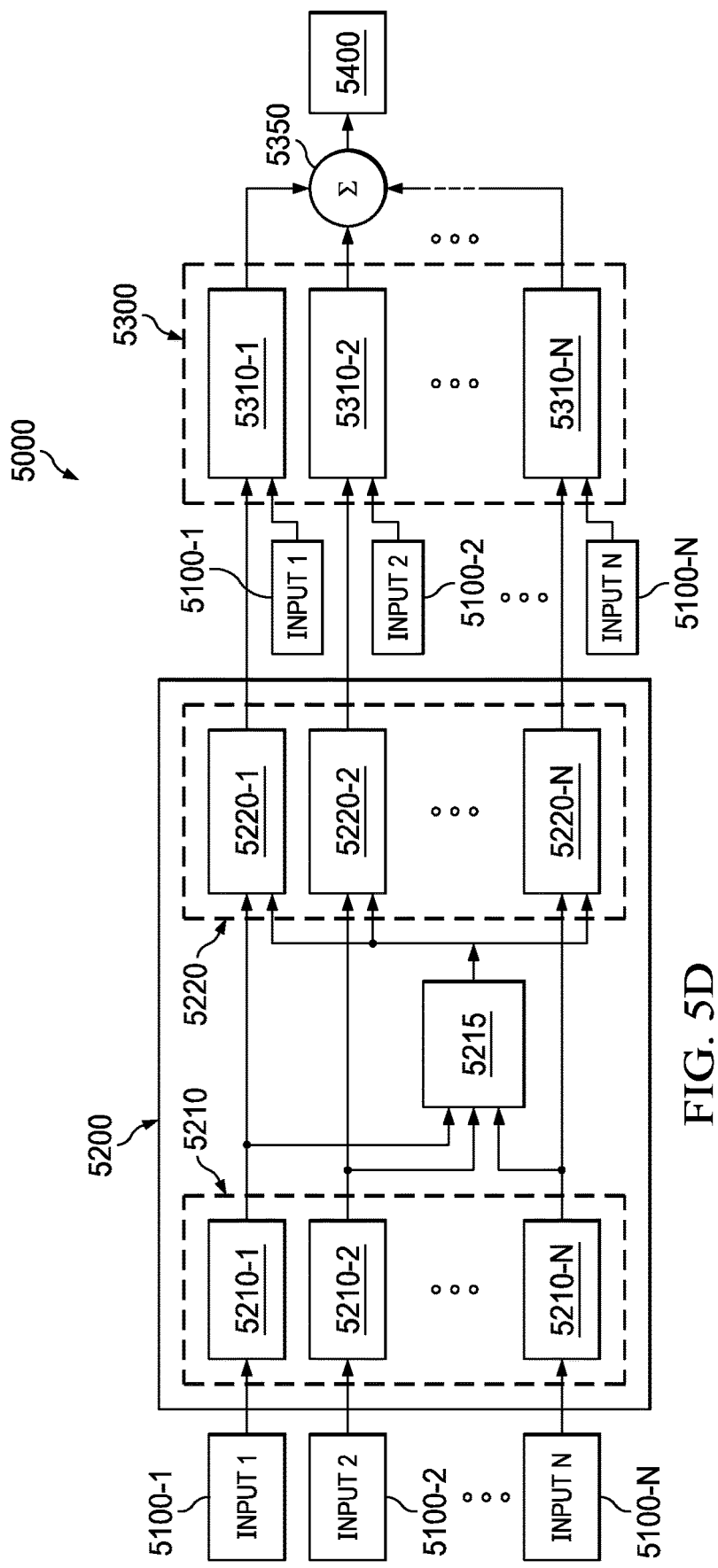

A possible implementation of a complete system 5000, i.e., comprising both the control network and the transformation networks, is schematically shown in FIG. 5D. In particular, the system 5000 may comprise a controller network (or referred to as the first network) 5200 that takes a number of audio signals 5100-1, 5100-2, . . . , 5100-N as input and generates a set of parameters (e.g., control parameters, panning parameters, etc.). Subsequently, the input audio tracks 5100-1 to 5100-N together with the generated parameters are fed into one or more instances of the transformation network (or referred to as the second network) 5300, in order to generate the final output mix 5400. To be more specific, the role of controller network 5200 is to process the input channels 5100-1 to 5100-N, extract (e.g., by the encoding stage 5210) useful information about these inputs, process (e.g., by the post-processing stage 5220) the extract information (possibly also based on a combined representation as exemplified as 5215), and finally produce the set of parameters that will be passed to the associated transformation network 5300 in order to process the input channel in question.

As indicated above, in the specific example of FIG. 5D, weight-sharing has been applied in a system-level. That is, one pair of an encoder and a post-processor is applied individually to each of the input channels, producing a set of parameters for each channel to be passed to the set of transformation networks, which also have shared weights. As such, efficiency of the whole system may be further improved. Nevertheless, it should be understood that any other suitable configuration (of the controller network 5200 and/or the transformation network 5300) may be employed, as will be appreciated by the skilled person.

Furthermore, in the example of FIG. 5D the output mix 5400 is generated as a sum (exemplified as 5350) of the outputs of the transformation networks 5300. However, it should be understood that any other suitable operation/ process may be applied in order to generate the final mix. As a general example (but not as limitation), at least one mixing gain (e.g., depending on whether stereo output would be desired) may be simply applied for the generation of the audio mix. In some other possible examples, one mixing gain and one panning parameter may be adopted, which may simply imply that the parameter of the other channel would correspond to one (1) minus such panning parameter.

Additionally, for the purpose of completeness of illustration, FIGS. 5A to C schematically illustrate possible implementations of an instance of the encoding stage 5210, an instance of the post-processing stage 5220 and an instance of the transformation networks 5300, respectively. Specifically, in the example as shown in FIG. 5A, the encoder may comprise a series of convolutional blocks and a fully connected (FC) block (which itself may comprise for example a series of linear layers and rectified linear unit (ReLU) activation functions). In the example of FIG. 5B, the post-processor may comprise a series of fully connected subnetworks, each of which may comprise a number of hidden linear layers, a parametric ReLU (PReLU) activation, and a dropout (e.g., with p=0.1), followed by an output layer. Notably, as mentioned above, in addition to the respective latent space representations generated by the encoding stage, the post-processor (or the post-processing stage in general) may optionally further take a combined (context) representation as input, such that information embedded in (some or all of) the input channels may be captured. In the example of FIG. 5C, the transformation network may comprise a series of fully connected subnetworks, each of which may comprise a FC block, a series of temporal convolutional networks (TCNs, which will be discussed below in more detail) and an output layer. Of course, it should be understood that these implementations are merely illustrative, and that any other suitable implementations thereof could be adopted, as will be appreciated by the skilled person.

Figure 6:
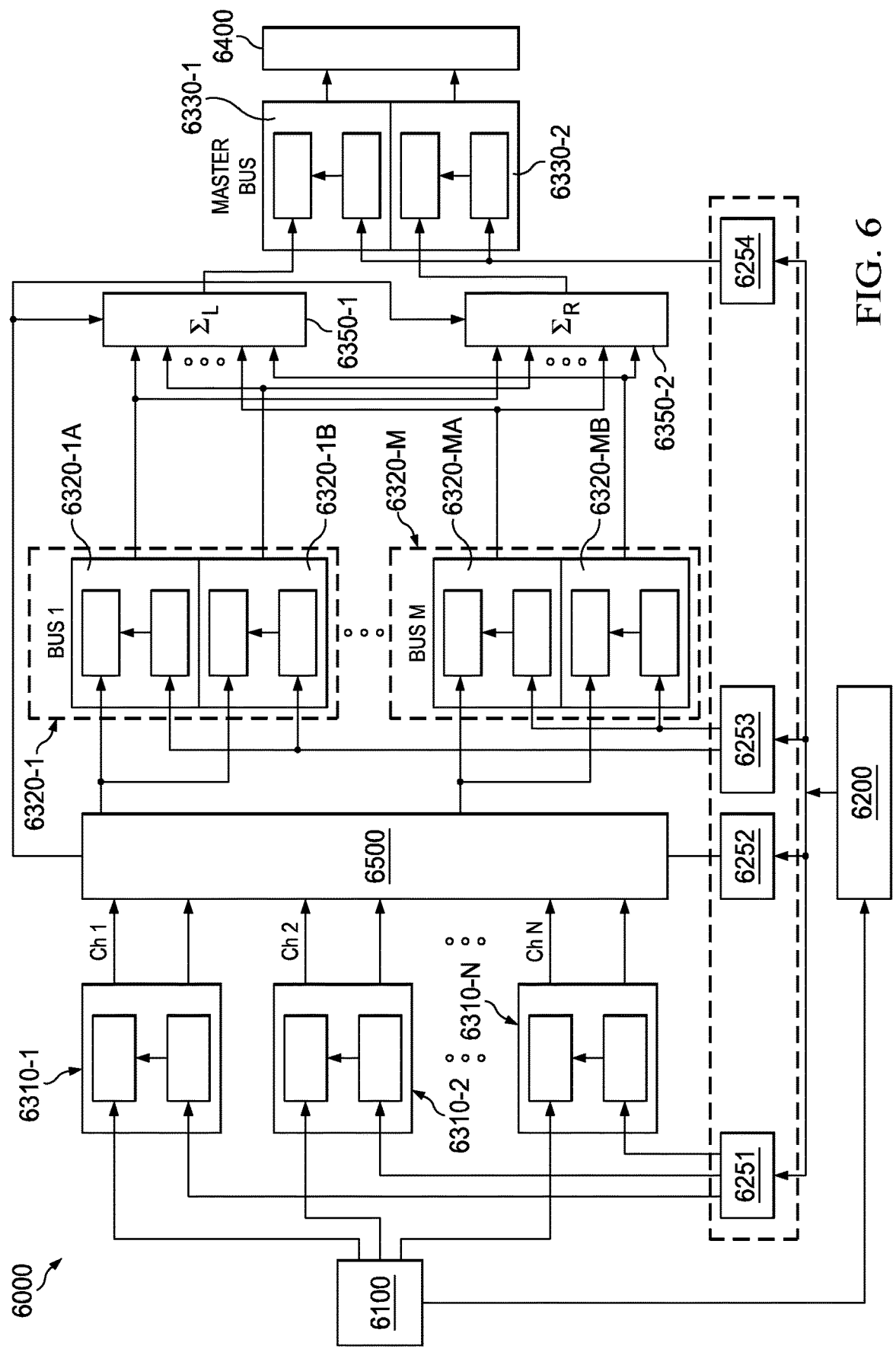
FIG. 6 is a schematic illustration of a block diagram of a system for performing multitrack mixing according to another embodiment of the present disclosure.

FIG. 6 schematically illustrates a block diagram of a system 6000 for performing multitrack mixing according to another embodiment of the present disclosure. Particularly, the system 6000 may be seen as an extended version of the system 5000, i.e., with several possible extensions that may also be likely to exist in the (more complete) process of audio mixing.

Thus, identical or like reference numbers in the system 6000 of FIG. 6 may still indicate identical or like elements in the system 5000 as shown in FIG. 5D, such that repeated description thereof may be omitted for reasons of conciseness.

Broadly speaking, the full system diagram 6000 shows the composition of multiple elements that make up the complete differentiable mixing console and the controller network 6200.

The input 6100 to the system 6000 may be a collection of (e.g., a number N of) audio signals (waveforms) that may correspond to e.g., different instrument recordings. In some possible implementations, each channel may take as input a single mono input signal for processing. First, these inputs 6100 are passed to the controller network 6200, which may perform an analysis and then generate a set of (e.g., control) parameters 6250 for some or all of the processing elements in the system 6000. These inputs 6100 are then passed to a series of (a first set of) transformation networks 6310-1, 6310-2, . . . , 6310-N, along with the corresponding generated (e.g., channel control) parameters 6251. The result of this processing (the first phase/stage of mixing) is an output that may be a stereo (as exemplified by the two-arrow-output by a respective transformation network) mixture of these tracks. As mentioned earlier, a number of signal processing elements may be included in the system's signal path in order to simulate a traditional mixing console that would be used by an audio engineer. Referring to the example of FIG. 6, that is to say, the system 6000 may be composed of N input channels, M stereo busses, and a master bus, which may generally follow a possible structure of a traditional mixing console. Compared to the traditional mixing console, the major difference is that these network elements may now be implemented by using neural networks, and hence differentiable. This enables to train the system to mimic the behavior of an audio engineer by training the system with a set of mixes made by audio engineers, in an efficient and yet flexible manner.

More specifically, to begin, each of the N inputs 6100 may be passed to the controller network 6200. This controller network 6200 performs an analysis of the input signals 6100 in an attempt to understand how the inputs should be processed in order to create a desirable mix. To achieve this, as discussed above, a learned encoder may be employed, which creates compressed representations of the inputs, distilling the most important information. The distilled information is then used by a neural network (e.g., a post-processor comprising linear layers and non-linear activations) to make a prediction of how the parameters 6250 for the entire mixing console should be set so as to achieve a desirable mix of the inputs. As mentioned earlier, the controller network may additionally comprise a step of combining (or, in some cases, concatenating) those feature space (compressed) representations to create a complete (combined) representation of the inputs, and the prediction of the parameters may then be performed based further on such combined representation.

These parameters 6250 are then passed onto the transformation networks, so that they can undertake the multi-stage processing of the input signals.

With these predicted parameters 6251, each of the N inputs 6100 are passed through several instances (may be referred to as a first set) of the transformation network 6310-1 to 6310-N. In the example of FIG. 6, each of the transformation networks is shown with two sub-elements, e.g., a T-DNN and a P-DNN as exemplified in FIG. 4B. The transformation network may be pre-trained in a separate task before being used in the full system 6000, as has been discussed above in detail with reference to FIGS. 4A and 4B. Notably, the training process is generally a self-supervised training task, where the input may be a mono waveform and a set of parameters that fully define the configuration of a real mixing console channel. The output may be a stereo waveform that is meant to predict the output that is produced by the real mixing console channel. The P-DNN and T-DNN are each neural networks that can be composed of various architectures, and therefore their composition is not limited in this system design. After this pre-training process, the transformation network is capable of closely mimicking the real mixing console channel, with the benefit that its elements are all differentiable and enable further training.

Since the transformation networks 6310-1 to 6310-N have been trained, when they are passed with a set of parameters 6251 and inputs 6100, the transformation networks 6310-1 to 6310-N (ideally) would carry out processing as would have been done by the real channel in mixing console, given the same inputs. In the example of FIG. 6, each of the N input channels 6100 may produce a stereo output. These outputs may then be sent to a routing component or subsystem (sometimes may also be simply referred to as a router) 6500, which may generally exist to serve the purpose of enabling the creation of bus-level mixes for the second (sub-) stage of processing. In other words, the router 6500 may be seen as a simple mixer that creates sub-mixes and sends them (i.e., the sub-mixes) for further processing, e.g., in the console or by the transformation network. For operating such routing component 6500, the controller network 6200 may be configured to further generate corresponding (e.g., router control) parameters 6252.

Figure 7:
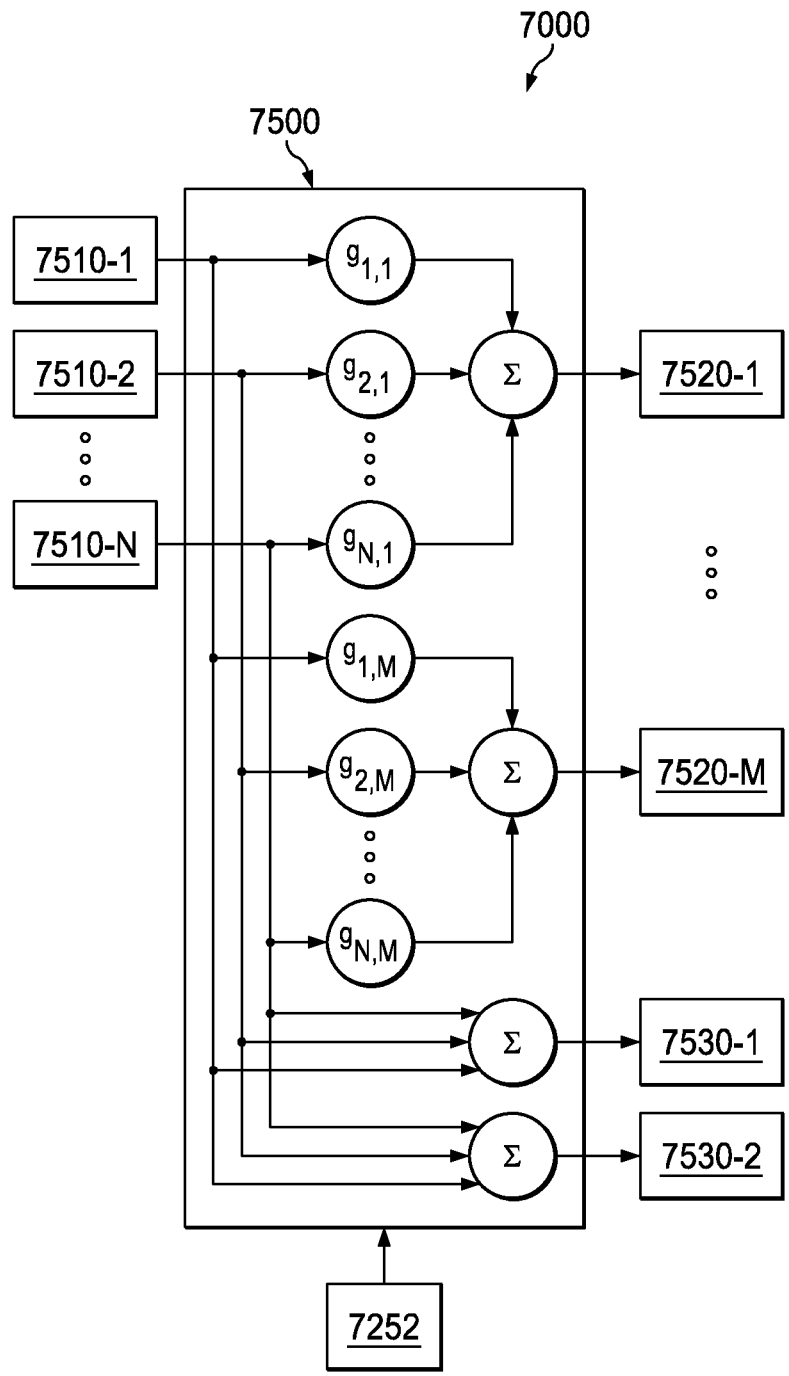
FIG. 7 is a schematic illustration of a block diagram of a routing component according to an embodiment of the present disclosure.

A possible (slightly detailed) implementation for the routing component 6500 is schematically shown in FIG. 7. Specifically, inside the router 7500, the parameters 7252 (e.g., provided by the controller 6200 as shown in FIG. 6) are used to create a number (e.g., M) unique bus-level mixes 7520-1 to 7520-M from the N input channel outputs 7510-1, 7510-2, . . . , 7510-N. Generally speaking, each input channel may be seen as a channel that takes as input a signal mono input signal for processing; and a bus may in some cases represent a channel that takes as input a summation of multiple stereo input signals for further processing. In some possible implementations, the routing component 7500 may as well to directly route the channel outputs to the master bus (left and right), as exemplified as 7530-1 and 7530-2 in FIG. 7. Specifically, the master bus may generally refer to a bus that collect all signals in the system and produce the final stereo output mixture.

Summarizing, the router 7500 may generally be seen as a component (subsystem) that handles signal flow(s) for the second round of processing, which may comprise using predicted parameters 7252 (e.g., from the controller network) to create bus-level mixes for the M busses and send out these mixes. Optionally, the router may further send a copy of each original input to the left and right master bus.

Now referring back to the example of FIG. 6, the bus-level mixes output by the router 6500 may then be sent to a number of (e.g., M) stereo-linked transformation network pairs 6320-1 (which consists of transformation networks 6320-1A and 6320-1B) along with further (e.g., bus control) parameters 6253 generated again by the controller network 6200, which would then form the M busses in the system 6000 as shown in FIG. 6. In some cases, these stereo-linked transformation networks 6320-1 to 6320-M may be simply referred to as a second set of instances of the transformation network. These busses may then each produces dual-stereo outputs which are summed (e.g., by 6350-1 and 6350-2, respectively) together to form a signal stereo output, which is then sent the master bus. Finally, the master bus may form the final (e.g., stereo-linked) transformation networks 6330-1 and 6330-2, which produce the final output mixture 6400 based on the further (e.g., master control) parameters 6254 generated by the controller network 6200. Notably, the stereo-linked connection may generally refer to the configuration of a pair of (two) transformation networks, each with its own input, where both transformation networks use the same parameter(s) to apply the same signal processing to each input, each producing a stereo output. Further, the dual-stereo may generally refer to the configuration of a system in which the input is a stereo signal, and the output produces separate signals for left and right outputs (channels), which may later be summed together respectively, to generate an overall left and right stereo signal. Such configuration/connection (i.e., stereo-linked and dual-stereo) is also clearly shown in the example of FIG. 6. Notably, in the case where stereo output mix is generated, the controller network may in some implementations be trained in such a manner that it is invariant under re-assignment of left and right channels. In some possible implementation, such invariance between the stereo channels may be achieved by considering the sum of the audio signals corresponding to the left and right channels, rather than considering those audio signals separately.

Summarizing, to address at least some or all of the issues identified earlier, the present disclosure seeks to design a system that comprises two networks. The first network (the transformation network) is pre-trained in a self-supervised manner to instill domain knowledge, and then a second (smaller) network (the controller network) is trained using the limited multitrack data to most effectively control the operation of a set of instances of the first network to create a quality mix. Multiple instances of this first network (the transformation network) may be used in order to construct a system that mimics the design of a traditional mixing console, in that it has multiple channels, routable busses, and a single summing master bus to which all signals are routed. In general, at least part of the goal is to design a second network (the controller network) which may learn to control these transformation networks by learning from the limited dataset of paired multitrack stems and mixes. Notably, similar to the (channel control) parameters 6251 as discussed above, the (router control) parameters 6252, the (bus control) parameters 6253, and/or the (master control) parameters 6254 may be generated (e.g., predicted) based on the input audio signals, and optionally further on a combined (or concatenated) representation of all input audio signals. Furthermore, it is also to be noted that, since a general goal of training the transformation network(s) is to mimic a mixing console, the parameters 6250 generated by the controller network may be human and/or machine interpretable parameters. Human interpretable parameters may generally mean that the parameters can be interpreted (understood) by human, e.g., an audio engineer, such that the audio engineer can (directly) use or apply those parameters for further audio signal processing or analysis, if deemed necessary. Similarly, machine interpretable parameters may generally mean that the parameter can be interpreted by machine, e.g., a computer or a program stored thereon, such that those parameters can be (directly) used by the program (e.g., a mixing console) for further audio processing or analysis, if deemed necessary. As such, the provision of interpretable parameters enables interaction e.g., by users to adjust the output mix, if necessary. Moreover, such interpretability also enables interaction from users to easily tweak the training models and correspondingly predictions according to their goals. Thereby, performance of the whole system can be further improved while at the same time retaining enough flexibly (e.g., in the sense of further adjustment or tweaking, if necessary).

In addition, though only one controller network may be present in the examples as shown in FIGS. 1, 2, 5 and 6, it should nevertheless be understood that, in some other cases, more than one instance of the controller network may as well be provided in a system. For instance, in some possible implementations, different instances of the controller network may be provided respectively for some of the transformation networks, the routing component, or the master bus. That is, different controller network may be provided to generated parameters that may be used by different subnetworks respectively.

Figure 8A:
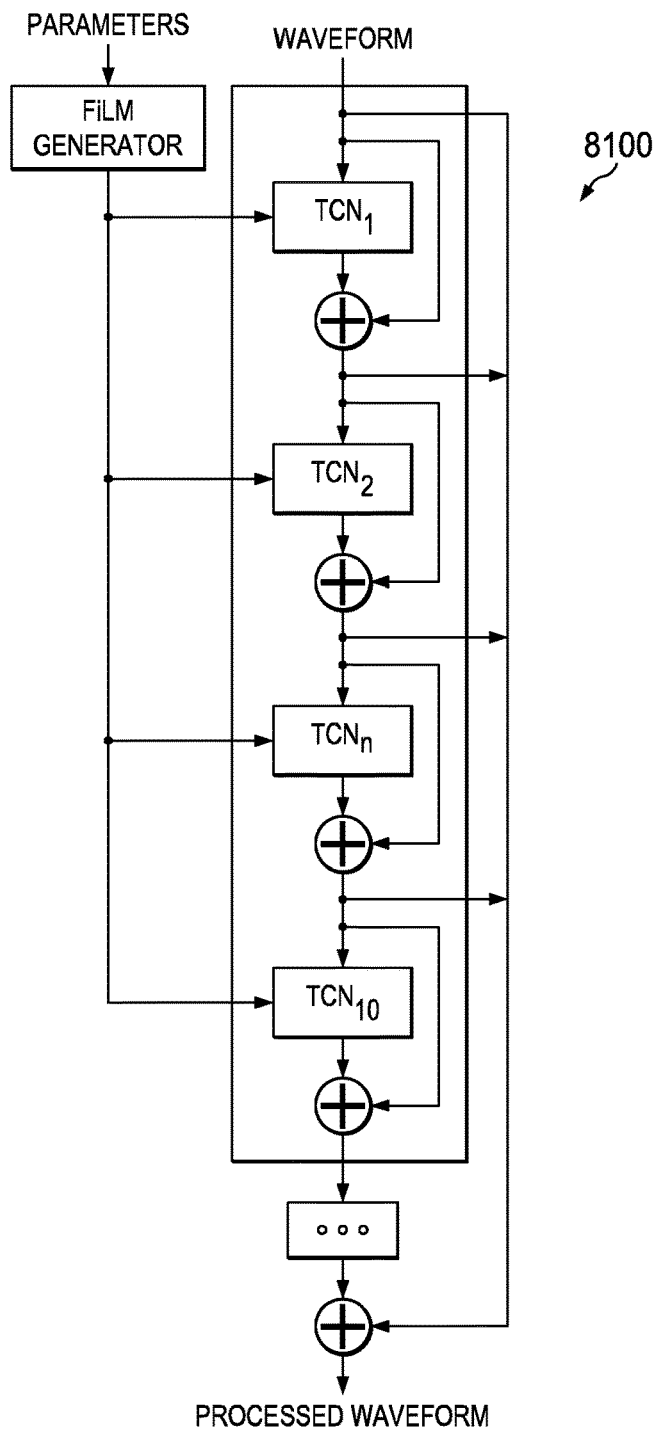
FIGS. 8A-8C are schematic illustrations respectively showing block diagrams of neural networks according to embodiments of the present disclosure.
Figure 8B:
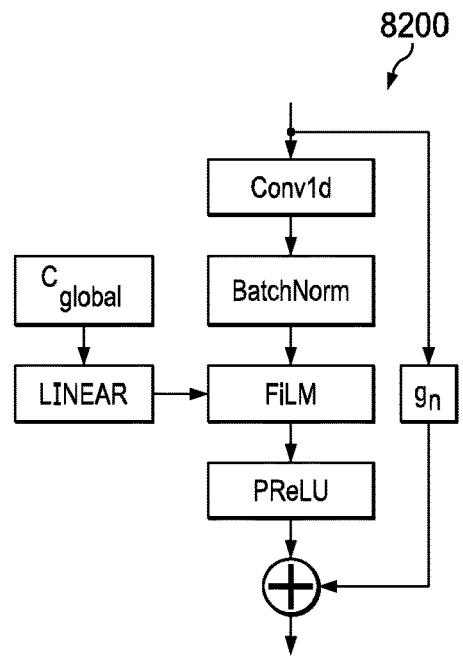
Figure 8C:
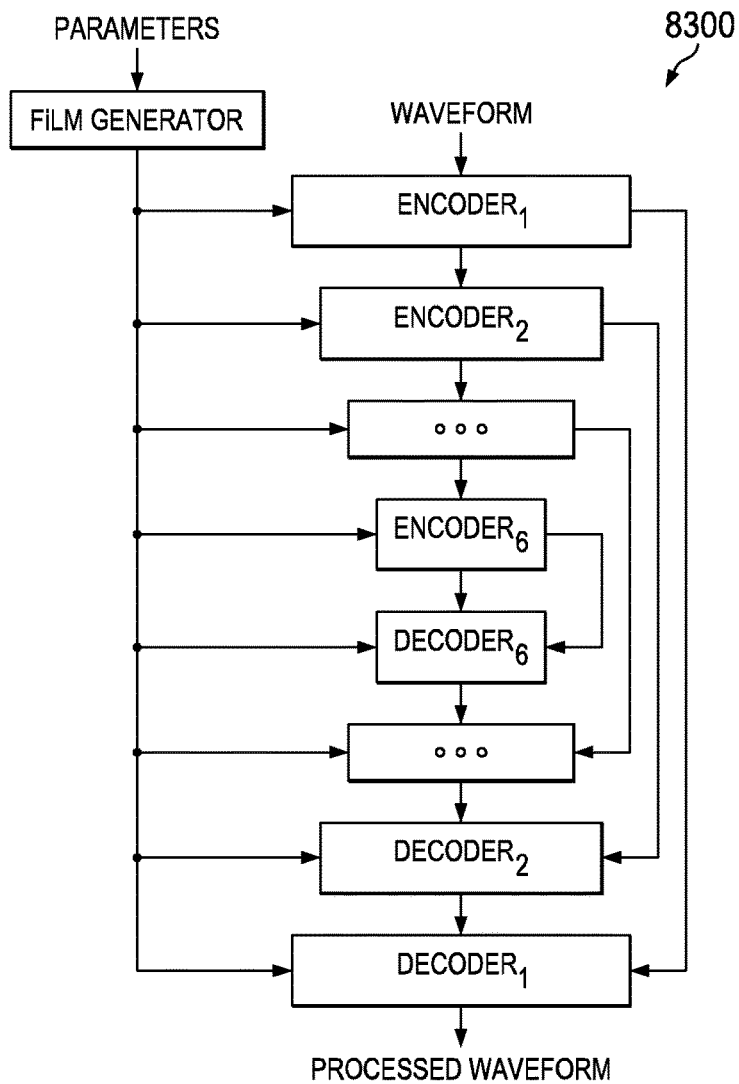

FIGS. 8A-8C schematically illustrate some possible implementations of neural networks according to some embodiments of the present disclosure. However, it may be worthwhile to point out that these possible implementations should merely be understood to be illustrative, and that any other suitable forms of neural network may be implemented, as will be appreciated by the skilled person.

In particular, FIG. 8A may represent a schematical illustration of a high-level view of a TCN architecture 8100 (e.g., may be suitable for implementing the transformation network as shown in FIG. 5C). Generally speaking, the TCN may be considered to formalize the application of convolutional neural networks (CNNs) to time series data, and may include a number of components such as one dimensional kernels, convolutions with exponentially increasing dilation factors, as well as residual connections. In the example architecture as shown in FIG. 8A, there is provided a stack (e.g., 10) of convolutional blocks (indicated as $TCN_n$), possibly with exponentially increasing dilation factors. Each block within the stack may have a residual connection as well as an additive skip connection to the output. Feature-wise linear modulation (or FiLM for short) generally refers to a method of conditioning which formalizes techniques as a learned, affine transformation that is performed on intermediate features of a CNN.

An example of a possible implementation of a single convolutional block 8200 (indicated as $TCN_n$ in FIG. 8A) is schematically shown in FIG. 8B. Specifically, the convolutional block may be composed of a standard formulation that features a one-dimensional convolution, batch normalization, an affine transformation to inject conditioning via the FiLM mechanism, and finally a PReLU activation. To compute the final output of the block, a residual connection is included, with a learned scaling coefficient (denoted $g_n$ in Figure FIG. 8B).

FIG. 8C schematically illustrates a high-level view 8300 of another possible implementation of a neural network, which in this case may be a Wave-U-Net based architecture. Generally speaking, the Wave-U-Net may be seen as an adaption of a traditional U-Net architecture to operate on waveforms, including some additional approaches to incorporate additional input context, and possibly using strided transposed convolutions for upsampling.

Nevertheless, as has been indicated above already, these possible implementations for the neural networks may just serve the purpose of illustration. Any other suitable forms, such as a recurrent neural network (RNN), or including attention layers or transformers, may be adopted as well.

Figure 9:
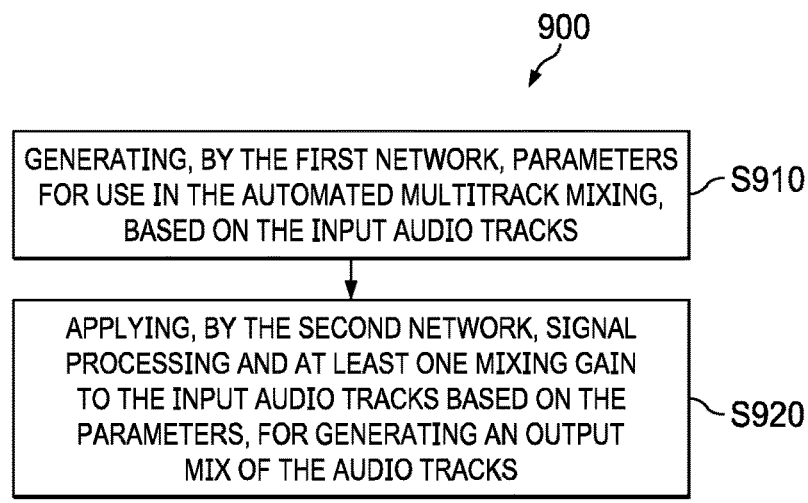
FIG. 9 is a flowchart illustrating an example of a method of operating a deep-learning-based system for performing automated multitrack mixing based on a plurality of input audio tracks according to an embodiment of the disclosure.

FIG. 9 is a flowchart illustrating an example of a method 900 of operating a deep-learning-based system for performing automated multitrack mixing based on a plurality of input audio tracks according to an embodiment of the disclosure. The system may for example be the same as or similar to the system 5000 as shown in FIG. 5 or the system 6000 as shown in FIG. 6. That is, the system may comprise one or more instances of a suitable controller network (or simply referred to as the first network) and one or more (weight-sharing) instances of a suitable transformation network (or simply referred to as the second network) as shown in either figure. Therefore, repeated description thereof may be omitted for reasons of conciseness.

In particular, the method 900 may start with step S910 of generating, by the first network, parameters for use in the automated multitrack mixing, based on the input audio tracks.

Subsequently, the method 900 may continue with step S920 of applying, by the second network, signal processing and at least one mixing gain to the input audio tracks based on the parameters, for generating an output mix of the audio tracks.

FIG. 10 is a flowchart illustrating an example of a method of training a deep-learning-based system for performing automated multitrack mixing according to an embodiment of the disclosure. The system may for example be the same as or similar to the system 5000 as shown in FIG. 5 or the system 6000 as shown in FIG. 6. That is, the system may comprise one or more instances of a suitable controller network (or simply referred to as the first network) and one or more (weight-sharing) instances of a suitable transformation network (or simply referred to as the second network) as shown in either figure. Therefore, repeated description thereof may be omitted for reasons of conciseness.

As has been illustrated above, the training of the second network (i.e., the transformation network) may be performed prior to that of the first network (i.e., the controller network). Thus, broadly speaking, the training of the whole system may be seen as being split into two separate training phases, which are respectively illustrated in FIGS. 10A and 10B.

Figure 10A:
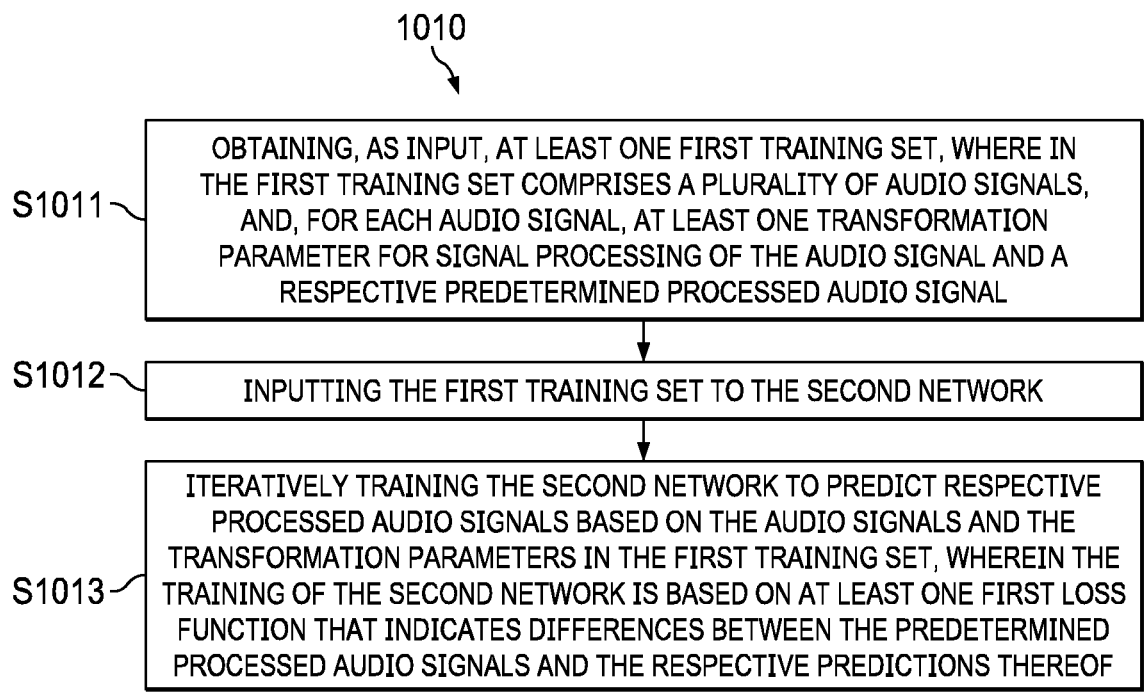
FIG. 10A-10B are flowcharts illustrating an example of a method of training a deep-learning-based system for performing automated multitrack mixing according to an embodiment of the disclosure.

Particularly, FIG. 10A schematically illustrates an example of a (first) training phase 1010 for training the second network (i.e., the transformation network) and starts with step S1011 of obtaining, as input, at least one first training set. The first training set may comprise a plurality of audio signals, and, for each audio signal, at least one transformation parameter for signal processing of the audio signal and a respective predetermined processed audio signal. Then the training phase 1010 continues with step S1012 of inputting the first training set to the second network; and subsequently with step S1013, iteratively training the second network to predict respective processed audio signals based on the audio signals and the transformation parameters in the first training set. More particularly, the training of the second network may be based on at least one first loss function that indicates differences between the predetermined processed audio signals and the respective predictions thereof.

Figure 10B:
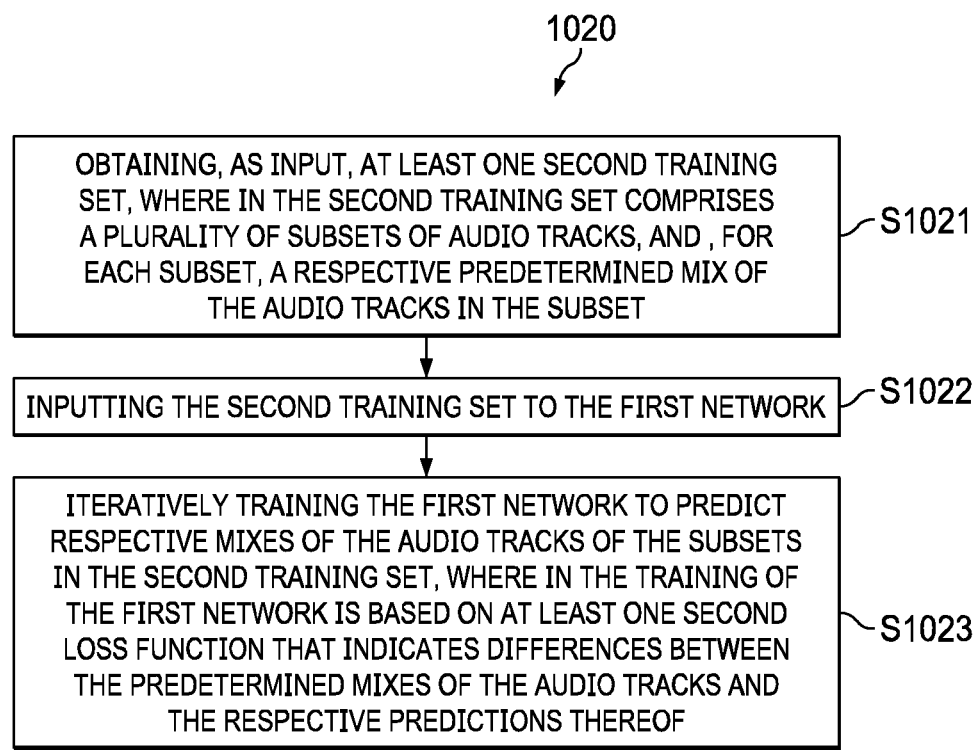

Further, FIG. 10B schematically illustrates an example of a (second) training phase 1020 for training the first network (i.e., the controller network) and starts with step S1021 of obtaining, as input, at least one second training set. The second training set may comprise a plurality of subsets of audio tracks, and, for each subset, a respective predetermined mix of the audio tracks in the subset. Then the training phase 1020 continues with step S1022 of inputting the second training set to the first network; and subsequently with step S1023, iteratively training the first network to predict respective mixes of the audio tracks of the subsets in the second training set. More particularly, the training of the first network may be based on at least one second loss function that indicates differences between the predetermined mixes of the audio tracks and the respective predictions thereof. In some possible examples, the predicted mixes of the audio tracks may be stereo mixes. Accordingly, the second loss function may be a stereo loss function and may be constructed in such a manner that it is invariant under re-assignment of left and right channels. In some possible implementations, such invariance between the stereo channels may be achieved by considering the sum of the audio signals corresponding to the left and right channels, rather than considering those audio signals separately.

Notably, the present disclosure may be exploited in several ways where an automatic mixing may be of interest. For instance (but not as limitation), in some use cases, users may upload isolated/instrument tracks or those may be obtained from a music source separation algorithm. Next, the automatic mixing process could take place, which would provide an enhanced quality of the user generated content and be a distinctive feature of the product. Another potential opportunity may be in cases where a recording engineer could start with an initial mix provided by the proposed approach, with the potential inclusion of further spatial mixing capabilities.

Of course, any other suitable use case may be exploited, as will be understood and appreciated by the skilled person. Yet a further possibility may be when a user provides (e.g., uploads) an already mixed piece of audio signal. Then, if one has some sort of source separation algorithm which could decompose the mix into separate tracks. Those separate track could then be auto-mixed (again) by using the approach of the present disclosure. The result would be a different mix based on a mix signal, and may include human intervention to refine the automix result before producing the final mixture.

In the above, possible methods of training and operating a deep-learning-based system for determining an indication of an audio quality of an input audio sample, as well as possible implementations of such system have been described. Additionally, the present disclosure also relates to an apparatus for carrying out these methods. An example of such apparatus may comprise a processor (e.g., a central processing unit (CPU), a graphics processing unit (GPU), a digital signal processor (DSP), one or more application specific integrated circuits (ASICs), one or more radio-frequency integrated circuits (RFICs), or any combination of these) and a memory coupled to the processor. The processor may be adapted to carry out some or all of the steps of the methods described throughout the disclosure.

The apparatus may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that apparatus. Further, the present disclosure shall relate to any collection of apparatus that individually or jointly execute instructions to perform any one or more of the methodologies discussed herein.

The present disclosure further relates to a program (e.g., computer program) comprising instructions that, when executed by a processor, cause the processor to carry out some or all of the steps of the methods described herein.

Yet further, the present disclosure relates to a computer-readable (or machine-readable) storage medium storing the aforementioned program. Here, the term "computer-readable storage medium" includes, but is not be limited to, data repositories in the form of solid-state memories, optical media, and magnetic media, for example.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method.

Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Enumerated example embodiments ("EEEs") of the present disclosure have been described above in relation to methods and systems for determining an indication of an audio quality of an audio input. Thus, an embodiment of the present invention may relate to one or more of the examples, enumerated below:

EEE 1. A system for automated multitrack mixing in the waveform domain, the system comprising:
- a controller configured to analyze a plurality of input waveforms using a neural network to determine at least one parameter for a plurality of transformation networks and a router;
- a first transformation network configured to generate a stereo output for each input waveform based on the at least one parameter;
- a router configured to generate a mix of the stereo outputs for the plurality of input waveforms, wherein the router is configured to input the stereo outputs into a plurality of busses; and a second transformation network configured to generate a final stereo output from the output of the plurality of busses.

EEE 2. A deep-learning-based system for performing automated multitrack mixing based on a plurality of input audio tracks, wherein the system comprises:
- one or more instances of a deep-learning-based first network; and
- one or more instances of a deep-learning-based second network,
- wherein the first network is configured to, based on the input audio tracks, generate parameters for use in the automated multitrack mixing; and
- wherein the second network is configured to, based on the parameters, apply signal processing and at least one mixing gain to the input audio tracks, for generating an output mix of the audio tracks.

EEE 3. The system according to EEE 2, wherein the output mix is a stereo mix.

EEE 4. The system according to EEE 2 or 3, wherein the first and second networks are trained separately, and wherein the first network is trained based on the pre-trained second network.

EEE 5. The system according to any one of the preceding EEEs, wherein a number of instances of the first network and/or a number of instances of the second network is determined in accordance with a number of the input audio tracks.

EEE 6. The system according to any one of the preceding EEEs, wherein the first network comprises:
- a first stage; and
- a second stage; and
- wherein generating the parameters by the first network comprises:
- mapping, by the first stage, each of the input audio tracks into a respective feature space representation; and
- generating, by the second stage, parameters for use by the second network, based on the feature space representations.

EEE 7. The system according to EEE 6, wherein the generating, by the second stage, the parameters for use by the second network comprises:
- generating a combined representation based on the feature space representations of the input audio tracks; and
- generating parameters for use by the second network based on the combined representation.

EEE 8. The system according to EEE 7, wherein generating the combined representation involves an averaging process on the feature space representations of the input audio tracks.

EEE 9. The system according to any one of the preceding EEEs, wherein the first network is trained based on at least one loss function that indicates differences between predetermined mixes of audio tracks and respective predictions thereof.

EEE 10. The system according to any one of the preceding EEEs, wherein the first network is trained by:
- obtaining, as input, at least one first training set, wherein the first training set comprises a plurality of subsets of audio tracks, and, for each subset, a respective predetermined mix of the audio tracks in the subset;
- inputting the first training set to the first network; and
- iteratively training the first network to predict respective mixes of the audio tracks of the subsets in the training set,
- wherein the training is based on at least one first loss function that indicates differences between the predetermined mixes of the audio tracks and respective predictions thereof.

EEE 11. The system according to EEE 10, wherein the predicted mixes of the audio tracks are stereo mixes, and wherein the first loss function is a stereo loss function and is constructed in such a manner that it is invariant under re-assignment of left and right channels.

EEE 12. The system according to EEE 10 or 11, wherein the training of the first network to predict the mixes of the audio tracks comprises, for each subset of audio tracks:
- generating, by the first network, a plurality of predicted parameters in accordance with the subset of audio tracks;
- feeding the predicted parameters to the second network; and
- generating, by the second network, the prediction of the mix of the subset of audio tracks, based on the predicted parameters and on the subset of audio tracks.

EEE 13. The system according to any one of the preceding EEEs, wherein a number of instances of the second network equals a number of the input audio tracks, wherein the second network is configured to, based on at least part of the parameters, perform signal processing on a respective input audio track to generate a respective processed output, wherein the processed output comprises left and right channels, and wherein the output mix is generated based on the processed outputs.

EEE 14. The system according to EEE 13, wherein the system further comprises a routing component, wherein the routing component is configured to generate a number of intermediate stereo mixes based on the processed outputs, and wherein the output mix is generated based on the intermediate mixes.

EEE 15. The system according to EEE 14, wherein the first network is configured to further generate parameters for the routing component.

EEE 16. The system according to EEE 14 or 15, wherein the one or more instances of the second network is a first set of one or more instances of the second network, wherein the system further comprises a second set of one or more instances of the second network, and wherein a number of instances of the second set of one or more instances of the second network is determined in accordance with the number of the intermediate mixes.

EEE 17. The system according to EEE 16, wherein the first network is configured to further generate parameters for the second set of instances of the second network.

EEE 18. The system according to EEE 16 or 17, wherein the system is configured to further generate a left mastering mix and a right mastering mix based on the intermediate mixes, wherein the system further comprises a pair of instances of the second network, and wherein the pair of instances of second networks are configured to generate the output mix based on the left and right mastering mixes.

EEE 19. The system according to EEE 18, wherein the first network is configured to further generate parameters for the pair of instances of second networks.

EEE 20. The system according to any one of the preceding EEEs, wherein the second network is trained by:
    obtaining, as input, at least one second training set, wherein the second training set comprises a plurality of audio signals, and, for each audio signal, at least one transformation parameter for signal processing of the audio signal and a respective predetermined processed audio signal;
    inputting the second training set to the second network; and
    iteratively training the second network to predict respective processed audio signals based on the audio signals and the transformation parameters,
    wherein the training is based on at least one second loss function that indicates differences between the predetermined processed audio signals and the respective predictions thereof.

EEE 21. The system according to any one of the preceding EEEs, wherein the parameters generated by the first network are human and/or machine interpretable parameters.

EEE 22. The system according to any one of the preceding EEEs, wherein the parameters generated by the first network comprise control parameters and/or panning parameters.

EEE 23. The system according to any one of the preceding EEEs, wherein the first and/or second network comprises at least one neural network, the neural network comprising a linear layer and/or a multilayer perceptron, MLP.

EEE 24. The system according to EEE 23, wherein the neural network is a convolutional neural network, CNN, such as a temporal convolutional network, TCN, or a Wave-U-Net, a recurrent neural network, RNN, or including attention layers or transformers.

EEE 25. A deep-learning-based system for performing automated multitrack mixing based on a plurality of input audio tracks, the system comprising:
    a transformation network,
    wherein the transformation network is configured to apply signal processing and at least one mixing gain to the input audio tracks for generating an output mix of the audio tracks, based on one or more parameters.

EEE 26. The system according to EEE 25, wherein the parameters are human interpretable parameters.

EEE 27. The system according to any one of the preceding EEEs, wherein the system comprises a plurality of instances of the first network in a weight-sharing configuration; and/or a plurality of instances of the second network in a weight-sharing configuration.

EEE 28. A method of operating a deep-learning-based system for performing automated multitrack mixing based on a plurality of input audio tracks, wherein the system comprises one or more instances of a deep-learning-based first network and one or more instances of a deep-learning-based second network, the method comprising:
    generating, by the first network, parameters for use in the automated multitrack mixing, based on the input audio tracks; and
    applying, by the second network, signal processing and at least one mixing gain to the input audio tracks based on the parameters, for generating an output mix of the audio tracks.

EEE 29. A method of training a deep-learning-based system for performing automated multitrack mixing based on a plurality of input audio tracks, wherein the system comprises one or more instances of a deep-learning-based first network and one or more instances of a deep-learning-based second network, the method comprising:
    a training phase for training the second network, wherein the training phase for training the second network comprises:
        obtaining, as input, at least one first training set, wherein the first training set comprises a plurality of audio signals, and, for each audio signal, at least one transformation parameter for signal processing of the audio signal and a respective predetermined processed audio signal;
        inputting the first training set to the second network; and
        iteratively training the second network to predict respective processed audio signals based on the audio signals and the transformation parameters in the first training set,
        wherein the training of the second network is based on at least one first loss function that indicates differences between the predetermined processed audio signals and the respective predictions thereof.

EEE 30. The method according to EEE 29, wherein the method further comprises:
    a training phase for training the first network, wherein the training phase for training the first network comprises:
        obtaining, as input, at least one second training set, wherein the second training set comprises a plurality of subsets of audio tracks, and, for each subset, a respective predetermined mix of the audio tracks in the subset;
        inputting the second training set to the first network; and
        iteratively training the first network to predict respective mixes of the audio tracks of the subsets in the second training set,
        wherein the training of the first network is based on at least one second loss function that indicates differences between the predetermined mixes of the audio tracks and the respective predictions thereof.

EEE 31. The method according to EEE 30, wherein the training phase for training the first network starts after the training phase for training the second network has been finished.

EEE 32. A program comprising instructions that, when executed by a processor, cause the processor to carry out steps of the method according to any one of EEEs 1 and 28 to 31.

EEE 33. A computer-readable storage medium storing the program according to EEE 32.

EEE 34. An apparatus comprising a processor and a memory coupled to the processor, wherein the processor is adapted to cause the apparatus to carry out steps of the method according to any one of EEEs 1 and 28 to 31.

The invention claimed is:

1. A deep-learning-based system for performing automated multitrack mixing based on a plurality of input audio tracks, wherein the system comprises:
    one or more instances of a deep-learning-based controller network; and
    one or more instances of a deep-learning-based transformation network,
    wherein the controller network is configured to, based on the input audio tracks, generate parameters for use in the automated multitrack mixing;
    wherein the transformation network is configured to, based on the parameters, apply signal processing and at least one mixing gain to the input audio tracks, for generating an output mix of the audio tracks;
wherein the controller network and transformation network are trained separately, and
wherein the controller network is trained based on the pre-trained transformation network.

2. The system according to claim 1, wherein the output mix is a stereo mix.

3. The system according to claim 1, wherein the controller network comprises:
a first stage; and
a second stage; and
wherein generating the parameters by the controller network comprises:
mapping, by the first stage, each of the input audio tracks into a respective feature space representation; and
generating, by the second stage, parameters for use by the transformation network, based on the feature space representations.

4. The system according to claim 3, wherein the generating, by the second stage, the parameters for use by the transformation network comprises:
generating a combined representation based on the feature space representations of the input audio tracks; and
generating parameters for use by the transformation network based on the combined representation.

5. The system according to claim 4, wherein generating the combined representation involves an averaging process on the feature space representations of the input audio tracks.

6. The system according to claim 1, wherein the controller network is trained based on at least one loss function that indicates differences between predetermined mixes of audio tracks and respective predictions thereof.

7. The system according to claim 1, wherein the controller network is trained by:
obtaining, as input, at least one first training set, wherein the first training set comprises a plurality of subsets of audio tracks, and, for each subset, a respective predetermined mix of the audio tracks in the subset;
inputting the first training set to the controller network; and
iteratively training the controller network to predict respective mixes of the audio tracks of the subsets in the training set,
wherein the training is based on at least one first loss function that indicates differences between the predetermined mixes of the audio tracks and respective predictions thereof.

8. The system according to claim 7, wherein the predicted mixes of the audio tracks are stereo mixes, and wherein the first loss function is a stereo loss function and is constructed in such a manner that it is invariant under re-assignment of left and right channels.

9. The system according to claim 7, wherein the training of the controller network to predict the mixes of the audio tracks comprises, for each subset of audio tracks:
generating, by the controller network, a plurality of predicted parameters in accordance with the subset of audio tracks;
feeding the predicted parameters to the transformation network; and
generating, by the transformation network, the prediction of the mix of the subset of audio tracks, based on the predicted parameters and on the subset of audio tracks.

10. The system according to claim 1, wherein a number of instances of the transformation network equals a number of the input audio tracks, wherein the transformation network is configured to, based on at least part of the parameters, perform signal processing on a respective input audio track to generate a respective processed output, wherein the processed output comprises left and right channels, and wherein the output mix is generated based on the processed outputs.

11. The system according to claim 10, wherein the system further comprises a routing component, wherein the routing component is configured to generate a number of bus-level mixes based on the processed outputs, and wherein the output mix is generated based on the bus-level mixes.

12. The system according to claim 11, wherein the controller network is configured to further generate parameters for the routing component.

13. The system according to claim 11, wherein the one or more instances of the transformation network is a first set of one or more instances of the transformation network, wherein the system further comprises a second set of one or more instances of the transformation network, and wherein a number of instances of the second set of one or more instances of the transformation network is determined in accordance with the number of the bus-level mixes.

14. The system according to claim 13, wherein the system is configured to further generate a left mastering mix and a right mastering mix based on the bus-level mixes, wherein the system further comprises a pair of instances of the transformation network, and wherein the pair of instances of transformation network are configured to generate the output mix based on the left and right mastering mixes.

15. The system according to claim 1, wherein the transformation network is trained by:
obtaining, as input, at least one second training set, wherein the second training set comprises a plurality of audio signals, and, for each audio signal, at least one transformation parameter for signal processing of the audio signal and a respective predetermined processed audio signal;
inputting the second training set to the transformation network; and
iteratively training the transformation network to predict respective processed audio signals based on the audio signals and the transformation parameters,
wherein the training is based on at least one second loss function that indicates differences between the predetermined processed audio signals and the respective predictions thereof.

16. The system according to claim 1, wherein the parameters generated by the controller network comprise at least one of human parameters, machine interpretable parameters, control parameters, and/or panning parameters.

17. The system according to claim 1, wherein the controller and/or transformation network comprises at least one neural network, the neural network comprising a linear layer and/or a multilayer perceptron, MLP.

18. A deep-learning-based system for performing automated multitrack mixing based on a plurality of input audio tracks, the system comprising:
a controller network, and
a transformation network,
wherein the input audio tracks are provided in parallel to the controller network and the transformation network, and
wherein the transformation network is configured to apply signal processing and at least one mixing gain to the input audio tracks for generating an output mix of the audio tracks, based on one or more parameters generated by the controller network.

19. The system according to claim 18, wherein the parameters are human interpretable parameters.

20. The system according to claim 18, wherein the system comprises a plurality of instances of the controller network in a weight-sharing configuration; and/or a plurality of instances of the transformation network in a weight-sharing configuration.

21. A method of operating a deep-learning-based system for performing automated multitrack mixing based on a plurality of input audio tracks, wherein the system comprises one or more instances of a deep-learning-based controller network and one or more instances of a deep-learning-based transformation network, the method comprising:
  providing the input audio tracks to the controller network and the transformation network in parallel;
  generating, by the controller network, parameters for use in the automated multitrack mixing, based on the input audio tracks; and
  applying, by the transformation network, signal processing and at least one mixing gain to the input audio tracks based on the parameters, for generating an output mix of the audio tracks.

* * * * *